(12) United States Patent
Lee et al.

(10) Patent No.: US 12,160,526 B2
(45) Date of Patent: Dec. 3, 2024

(54) ELECTRONIC APPARATUS AND CONTROLLING METHOD THEREOF

(71) Applicant: SAMSUNG ELECTRONICS CO., LTD., Suwon-si (KR)

(72) Inventors: Juneho Lee, Suwon-si (KR); Youngjae Yoon, Suwon-si (KR); Sehun Shim, Suwon-si (KR); Jongoh Hur, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 399 days.

(21) Appl. No.: 17/560,743

(22) Filed: Dec. 23, 2021

(65) Prior Publication Data

US 2022/0116228 A1    Apr. 14, 2022

Related U.S. Application Data

(63) Continuation of application No. PCT/KR2021/010433, filed on Aug. 6, 2021.

(30) Foreign Application Priority Data

Sep. 18, 2020    (KR) .................. 10-2020-0120941

(51) Int. Cl.
  *H04L 9/32*    (2006.01)
  *H04L 9/30*    (2006.01)

(52) U.S. Cl.
  CPC .............. *H04L 9/3263* (2013.01); *H04L 9/30* (2013.01); *H04L 9/3236* (2013.01); *H04L 9/3247* (2013.01)

(58) Field of Classification Search
  None
  See application file for complete search history.

(56) References Cited

U.S. PATENT DOCUMENTS 6,282,709 B1    8/2001   Reha et al.
7,069,452 B1 *  6/2006   Hind ..................... G06F 21/572
                                                              713/1

(Continued)

FOREIGN PATENT DOCUMENTS

JP    2002-215826    8/2002
JP    2003-99265     4/2003

(Continued)

OTHER PUBLICATIONS

Techotopia, An Overview of Public Key Infrastructures (PKI), 2016, https://www.techotopia.com/index.php/An_Overview_of_Public_Key_Infrastructures_(PKI), 7 Pages (Year: 2016).*

(Continued)

*Primary Examiner* — Christopher C Harris
(74) *Attorney, Agent, or Firm* — STAAS & HALSEY LLP

(57) ABSTRACT

An electronic apparatus including a memory, a communication interface, and a processor configured to store, in the memory, a first certificate including first certification information and a first electronic signature corresponding to the first certification information received from a first server based on an application data request, and store a second certificate including second certification information and a second electronic signature corresponding to the second certification information received from a second server. The processor obtains first hash data by decrypting the first electronic signature using a public key of the second server included in the second certification information, and second hash data by converting the first certification information. verifies the first server based on the first hash data and the second hash data, and controls, based on a the first server being verified, the communication interface to transmit a request signal for the application data to the first server.

14 Claims, 18 Drawing Sheets

(56) References Cited

U.S. PATENT DOCUMENTS

| | | |
|---|---|---|
| 7,440,571 B2 | 10/2008 | Sasselli et al. |
| 7,529,888 B2 | 5/2009 | Chen et al. |
| 7,549,042 B2 | 6/2009 | Glaum et al. |
| 7,721,101 B2 | 5/2010 | Yoshida et al. |
| 7,797,533 B2 * | 9/2010 | Murakawa .......... H04L 63/0442 |
| | | 713/173 |
| 7,810,088 B2 | 10/2010 | Herle et al. |
| 7,877,784 B2 | 1/2011 | Chow et al. |
| 8,166,285 B2 | 4/2012 | Lee |
| 8,245,218 B2 | 8/2012 | Giambalvo et al. |
| 8,347,082 B2 * | 1/2013 | Sato ..................... H04L 9/0891 |
| | | 380/285 |
| 8,554,686 B2 | 10/2013 | Paul et al. |
| 8,589,685 B2 | 11/2013 | Moon et al. |
| 8,701,102 B2 | 4/2014 | Appiah et al. |
| 9,015,837 B1 * | 4/2015 | De Los Reyes .......... G06F 8/65 |
| | | 717/172 |
| 9,100,172 B2 | 8/2015 | Kim et al. |
| 9,369,867 B2 | 6/2016 | Prakash et al. |
| 9,577,948 B2 | 2/2017 | Kim et al. |
| 10,263,961 B2 | 4/2019 | Chu et al. |
| 10,454,689 B1 * | 10/2019 | Sharifi Mehr ........ H04L 63/166 |
| 10,776,786 B2 | 9/2020 | Song et al. |
| 11,399,020 B2 * | 7/2022 | Secomandi ......... H04L 63/0823 |
| 11,528,150 B1 * | 12/2022 | Stapleton ............. H04L 9/3242 |
| 2005/0132357 A1 | 6/2005 | Shell et al. |
| 2006/0218545 A1 | 9/2006 | Taguchi |
| 2007/0011611 A1 | 1/2007 | Lee |
| 2007/0143303 A1 | 6/2007 | Cho |
| 2007/0169090 A1 | 7/2007 | Kang |
| 2007/0208786 A1 | 9/2007 | Kim |
| 2007/0220506 A1 | 9/2007 | Maruyama |
| 2008/0040705 A1 | 2/2008 | Jeong |
| 2010/0070760 A1 | 3/2010 | Vanderveen et al. |
| 2014/0245013 A1 | 8/2014 | Kim et al. |
| 2017/0063841 A1 | 3/2017 | Candelore |
| 2017/0093586 A1 | 3/2017 | Miranda et al. |
| 2017/0214662 A1 | 7/2017 | Chu et al. |
| 2017/0316497 A1 | 11/2017 | Song et al. |
| 2018/0367530 A1 * | 12/2018 | Mistry ................ H04L 63/0823 |
| 2020/0259668 A1 * | 8/2020 | Loreskar ................ G06F 21/44 |
| 2020/0274718 A1 | 8/2020 | Hwang et al. |
| 2020/0288305 A1 * | 9/2020 | Bok .................... H04L 63/0823 |
| 2020/0314090 A1 * | 10/2020 | Dantin, Jr. ............... H04L 9/50 |
| 2021/0152372 A1 * | 5/2021 | Hunt ...................... H04L 67/02 |
| 2021/0392002 A1 * | 12/2021 | Gray ................... H04L 9/3268 |
| 2022/0058270 A1 * | 2/2022 | Egranov .............. G06F 21/572 |
| 2022/0200812 A1 * | 6/2022 | Evangelos ........... H04L 9/3268 |
| 2022/0353061 A1 * | 11/2022 | Pala .................... H04L 9/0825 |

FOREIGN PATENT DOCUMENTS

| | | |
|---|---|---|
| KR | 10-0383667 | 5/2003 |
| KR | 10-2005-0123043 | 12/2005 |
| KR | 10-0622816 | 9/2006 |
| KR | 10-0633268 | 10/2006 |
| KR | 10-0691323 | 3/2007 |
| KR | 10-717064 | 5/2007 |
| KR | 10-0724878 | 6/2007 |
| KR | 10-0750132 | 8/2007 |
| KR | 10-0751262 | 8/2007 |
| KR | 10-0754198 | 9/2007 |
| KR | 10-0773317 | 11/2007 |
| KR | 10-0794800 | 1/2008 |
| KR | 10-0825348 | 4/2008 |
| KR | 10-0834676 | 6/2008 |
| KR | 10-0883208 | 2/2009 |
| KR | 10-0928713 | 11/2009 |
| KR | 10-2010-0017704 | 2/2010 |
| KR | 10-1019822 | 3/2011 |
| KR | 10-1063076 | 9/2011 |
| KR | 10-1086122 | 11/2011 |
| KR | 10-1094622 | 12/2011 |
| KR | 10-1120825 | 3/2012 |
| KR | 10-1143112 | 5/2012 |
| KR | 10-1145733 | 5/2012 |
| KR | 10-1272878 | 6/2013 |
| KR | 10-1280048 | 7/2013 |
| KR | 10-1371743 | 3/2014 |
| KR | 10-1565170 | 11/2015 |
| KR | 10-1702290 | 2/2017 |
| KR | 10-2017-0026129 | 3/2017 |
| KR | 10-2017-0087678 | 7/2017 |
| KR | 10-1780635 | 9/2017 |
| KR | 10-2018-0059856 | 6/2018 |
| KR | 10-1900710 | 11/2018 |
| KR | 10-2000162 | 7/2019 |
| KR | 10-2019-0108399 | 9/2019 |
| KR | 10-2020-0104671 | 9/2020 |
| KR | 10-2021-0063177 | 6/2021 |

OTHER PUBLICATIONS

International Search Report mailed Nov. 25, 2021 in International Application No. PCT/KR2021/010433.

Written Opinion of the International Search Report mailed Nov. 25, 2021 in International Patent Application No. PCT/KR2021/010433.

* cited by examiner

ELECTRONIC APPARATUS AND CONTROLLING METHOD THEREOF

CROSS-REFERENCE TO RELATED APPLICATIONS

This application is a continuation application, under 35 U.S.C. § 111(a), of International Patent Application No. PCT/KR2021/010433, filed on Aug. 6, 2021, which claims the claims benefit of priority to Korean Patent Application No. 10-2020-0120941, filed on Sep. 18, 2020, in the Korean Intellectual Property Office, the disclosure of which is incorporated by reference herein in its entirety.

BACKGROUND

1. Field

The disclosure relates to an electronic apparatus and a controlling method thereof. More particularly, the disclosure relates to an electronic apparatus which verifies a server configured to provide app data by using a certificate and a controlling method thereof.

2. Description of Related Art

An electronic apparatus in which a plurality of apps (or, applications) is to be installed may download respective apps from a separate server. Here, there is a need for the electronic apparatus to verify whether a server is reliable with respect to the server for downloading an app. The electronic apparatus may use a root certificate to verify the server from which the app is downloaded. To verify the server, there is a need for a root certificate to be installed in advance in the electronic apparatus.

The electronic apparatus may perform a firmware update to receive the root certificate. The electronic apparatus may require much time and cost in performing the firmware update.

Based on the app to be installed or installed in the electronic apparatus being in plurality, there may be a need for the electronic apparatus to perform verification on a plurality of servers proving a plurality of app data, respectively, and because firmware updates need to be performed every time, there may be the disadvantage of a long time being spent.

SUMMARY

Aspects of the disclosure are to address at least the above-mentioned problems and/or disadvantages and to provide at least the advantages described below. Accordingly, an aspect of the disclosure is to provide an electronic apparatus which verifies a reliability of a server configured to receive a root certificate individually and provide app data and a controlling method thereof.

According to an embodiment, an electronic apparatus includes a memory, a communication interface, and a processor configured to store, in the memory, a first certificate including first certification information and a first electronic signature corresponding to the first certification information received from a first server based on an application data request, and store, in the memory, a second certificate including second certification information and a second electronic signature corresponding to the second certification information received from a second server and store in the memory. The processor is configured to obtain first hash data by decrypting the first electronic signature using a public key of the second server included in the second certification information, obtain second hash data by converting the first certification information, verify the first server based on the first hash data and the second hash data, and control, based on the first server being verified, the communication interface to transmit a request signal for the application data to the first server.

The processor may be configured to verify the first server based on the first hash data and the second hash data being a match, and control, based on the first server being verified, the communication interface to transmit a request signal for address information to receive the application data to the first server.

The processor may be configured to receive address information including an address value and a third electronic signature corresponding to the address value from the first server, obtain third hash data by decrypting the third electronic signature using the public key of the second server, obtain fourth hash data by converting the address value included in the address information, and request, based on the third hash data and the fourth hash data being a match, application data to the address value.

The third electronic signature may include a hash value of the address value encrypted with a private key of the second server.

The processor may be configured to obtain third hash data including a hash value of the address value by decrypting the third electronic signature with the public key of the second server, and obtain fourth hash data corresponding to the address value included in the address information by using a hash function.

The first electronic signature may include a hash value of a public key of the first server and a hash value of first additional information which are encrypted with a private key of the second server, the first certification information may include the public key of the first server and the first additional information, and the first additional information may include an application subject of the first certificate and a validity period of the first certificate.

The processor may be configured to obtain the first hash data including the hash value of the public key of the first server and the hash value of the first additional information by decrypting the first electronic signature included in the first certificate with the public key of the second server included in the received second certificate, and obtain the public key of the first server and the second hash data corresponding to the first additional information included in the first certificate by using a hash function.

The second electronic signature may include a hash value of the public key of the second server and a hash value of second additional information which are encrypted with a private key of the second server, the second certification information may include the public key of the second server and the second additional information, and the second additional information may include an application subject of the second certificate and a validity period of the second certificate.

An application subject of the first certificate and an application subject of the second certificate may be different.

The processor may be configured to control the communication interface to transmit, to a third server, a control signal questioning whether a certificate which is not stored in a pre-stored certificate list can be identified based on a pre-set event.

According to an embodiment, a controlling method of an electronic apparatus includes receiving a first certificate including first certification information and a first electronic signature corresponding to the first certification information from a first server based on an application data request instruction, receiving a second certificate including second certification information and a second electronic signature corresponding to the second certification information from a second server, obtaining first hash data by decrypting the first electronic signature using a public key of the second server included in the second certification information, obtaining second hash data by converting the first certification information, verifying the first server based on the first hash data and the second hash data, and transmitting, based on the first server being verified, a request signal for the application data to the first server.

The verifying of the first server may be based on the first hash data and the second hash data being a match, and the transmitting of the request signal for the application data to the first server may include transmitting, based on the first server being verified, a request signal for address information to receive the application data to the first server.

The controlling method may further include receiving address information including an address value and a third electronic signature corresponding to the address value from the first server, obtaining third hash data by decrypting the third electronic signature using the public key of the second server, obtaining fourth hash data by converting the address value included in the address information, and requesting, based on the third hash data and the fourth hash data being a match, application data to the address value.

The third electronic signature may include a hash value of the address value encrypted with a private key of the second server.

The obtaining of the third hash data may include obtaining the third hash data including the hash value of the address value by decrypting the third electronic signature with the public key of the second server, and the obtaining the fourth hash data may include obtaining the fourth hash data corresponding to the address value included in the address information by using a hash function.

The first electronic signature may include the hash value of the public key of the first server and the hash value of the first additional information which are encrypted with the private key of the second server, the first certification information may include the public key of the first server and the first additional information, and the first additional information may include an application subject of the first certificate and a validity period of the first certificate.

The obtaining of the first hash data may include obtaining the first hash data including a hash value of the public key of the first server and a hash value of the first additional information by decrypting the first electronic signature included in the first certificate with the public key of the second server included in the received second certificate, and the obtaining the second hash data may include obtaining the public key of the first server and the second hash data corresponding to the first additional information included in the first certificate by using a hash function.

The second electronic signature may include a hash value of the public key of the second server and a hash value of second additional information which are encrypted with a private key of the second server, the second certification information may include the public key of the second server and the second additional information, and the second additional information may include an application subject of the second certificate and a validity period of the second certificate.

An application subject of the first certificate and an application subject of the second certificate may be different.

The controlling method may further include transmitting, to a third server, a control signal questioning whether a certificate which is not stored in a pre-stored certificate list can be identified based on a pre-set event.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION

The disclosure will be described in detail below with reference to the accompanying drawings.

The terms used in describing the various embodiments of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected, and in this case, the meaning of the term will be disclosed in greater detail in the corresponding description. Accordingly, the terms used herein are not to be understood simply as its designation but based on the meaning of the term and the overall context of the disclosure.

In the disclosure, expressions such as "comprise," "may comprise," "include," and "may include," are used to designate a presence of a corresponding characteristic (e.g., elements such as numerical value, function, operation, or component, etc.), and not to preclude a presence or a possibility of additional characteristics.

The expression at least one of A and/or B is to be understood as indicating at least one of "A" or "B" or "A and B."

Expressions such as "first," "second," "1st," or "2nd" used herein may be used to refer to various elements regardless of order and/or importance, and may be used only to distinguish one element from another, but not limit the corresponding elements.

When a certain element (e.g., first element) is indicated as being "(operatively or communicatively) coupled with/to" or "connected to" another element (e.g., second element), it may be understood as the certain element being directly coupled with/to another element, or as being coupled through other element (e.g., third element).

A singular expression includes a plural expression, unless otherwise specified. It is to be understood that the terms such as "comprise" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

The terms "module" or "part" used in the embodiments herein perform at least one function or operation, and may be implemented with a hardware or software, or a combination of hardware and software. Further, a plurality of "modules" or a plurality of "parts", except for a "module" or a "part" which needs to be implemented to a specific hardware, may be integrated to at least one module and implemented in at least one processor (not shown).

In this disclosure, the term "user" may refer to a person using an electronic apparatus or a device (e.g., artificial intelligence electronic apparatus) using an electronic apparatus.

The disclosure will be described in greater detail below with reference to the accompanied drawings.

Figure 1:
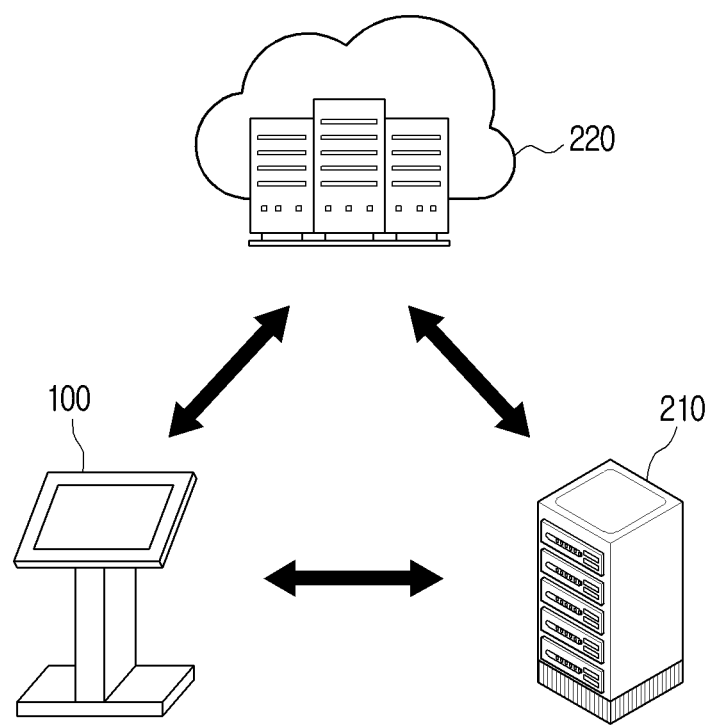
FIG. 1 is a diagram illustrating a server verification system according to an embodiment.

FIG. 1 is a diagram illustrating a server verification system according to an embodiment.

The server verification system may include an electronic apparatus 100, an app server 210, and a certificate authority server 220.

The server verification system may be a system configured to verify a certificate issued by a third party to determine reliability on a specific server.

The electronic apparatus 100 may be a device for installing in at least one app (or, application). For example, the electronic apparatus 100 may be a kiosk.

The app server 210 may mean a server which provides data (hereinafter, referred to as app data) on an app that is to be installed in the electronic apparatus 100. According to an embodiment, the app server 210 may directly transmit app data to the electronic apparatus 100. According to another embodiment, the app server 210 and a server providing different app data 211 may be configured to transmit app data to the electronic apparatus 100.

The certificate authority server 220 may mean a server of a reliable authority that generates a certificate. The certificate authority server 220 may mean an authority that issues a certificate so as to prove reliability on a specific server to multiple users.

When the electronic apparatus 100 tries to receive a specific app from the app server 210, the electronic apparatus 100 may request a certificate of the certificate authority to the app server 210. Here, the app server 210 may request to the certificate authority server 220 that the certificate of the certificate authority be issued. Then, the certificate authority server 220 may issue (or, generate) the certificate of the certificate authority and transmit to the app server 210. Here, the certificate authority server 220 may issue a root certificate separately from the certificate of the certificate authority requested by the app server and transmit to the electronic apparatus 100.

Figure 2:
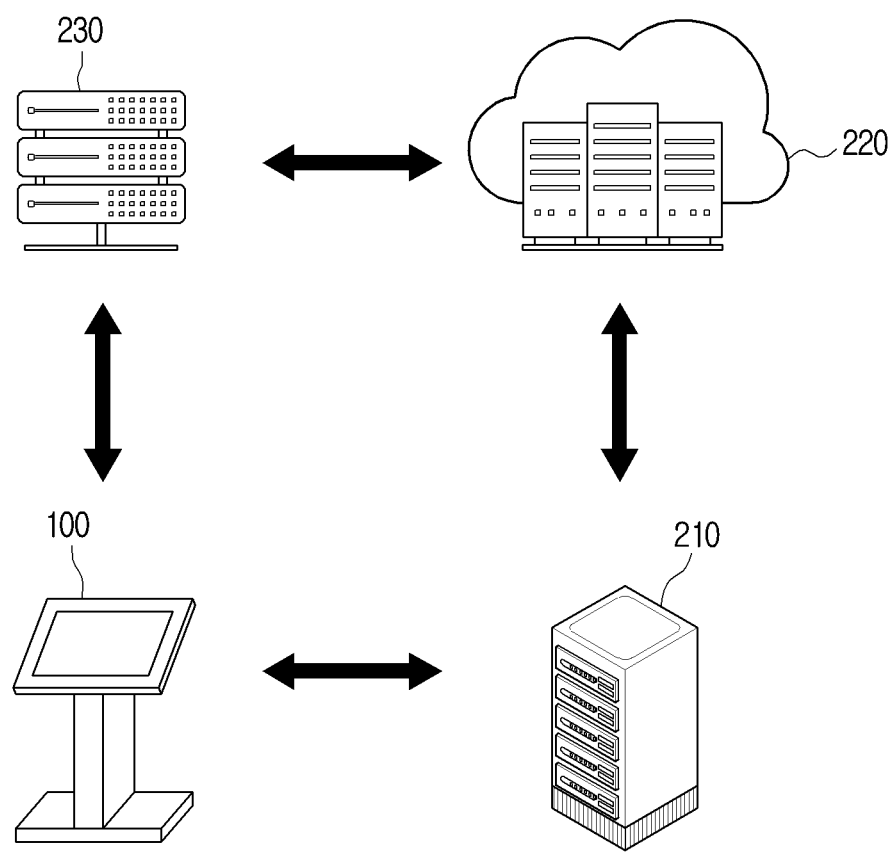
FIG. 2 is a diagram illustrating a server verification system according to another embodiment.

FIG. 2 is a diagram illustrating a server verification system according to another embodiment.

Referring to FIG. 2, the server verification system may be comprised of the electronic apparatus 100, the app server 210, the certificate authority server 220, and a manufacturer server 230.

Unlike the embodiment of FIG. 1, the manufacturer server 230 may be used additionally in the server verification operation. The electronic apparatus 100 may receive the root certificate by using the manufacturer server 230 without directly receiving the root certificate.

Specifically, the root certificate issued by the certificate authority server 220 may be transmitted to the manufacturer server 230, and the manufacturer server 230 may be configured to transmit the root certificate to the electronic apparatus 100. According to another embodiment, the root certificate may be stored in the electronic apparatus 100 directly by a manager after being stored in the manufacturer server 230.

The detailed control operation according to an embodiment of FIG. 2 will be described below in FIG. 6.

Figure 3:
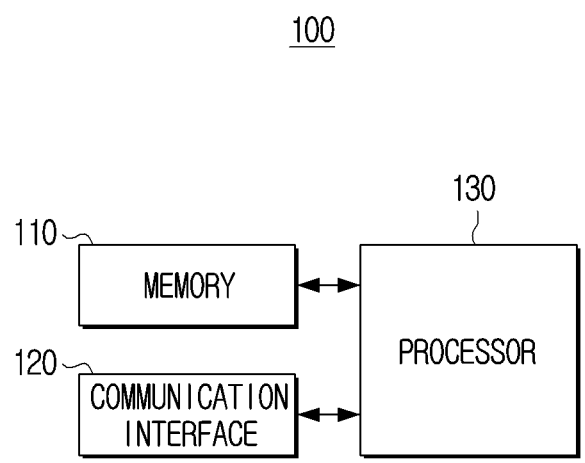
FIG. 3 is a block diagram illustrating an electronic apparatus according to an embodiment.

FIG. 3 is a block diagram illustrating an electronic apparatus according to an embodiment.

Referring to FIG. 3, the electronic apparatus 100 may be comprised of a memory 110, a communication interface 120, and a processor 130.

The electronic apparatus in accordance with the various embodiments of the disclosure may include at least one from among, for example, and without limitation, a smartphone, a tablet personal computer (PC), a mobile phone, a video telephone, an electronic book reader, a desktop PC, a laptop PC, a netbook computer, a workstation, a server, a personal digital assistance (PDA), a portable multimedia player (PMP), a MP3 player, a medical device, a camera, or a wearable device. The wearable device may include at least one from among an accessory type (e.g., a watch, a ring, a bracelet, an anklet, a necklace, a pair of glasses, a contact lens or a head-mounted-device (HMD)), a fabric or a garment-embedded type (e.g., an electronic clothing), a skin-attached type (e.g., a skin pad or a tattoo), or a bio-implantable circuit. In some embodiments, the electronic apparatus may include at least one from among, for example, and without limitation, a television, a digital video disk (DVD) player, an audio, a refrigerator, an air conditioner, a cleaner, an oven, a microwave, a washing machine, an air purifier, a set top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, an electronic frame, or the like.

The memory 110 may be implemented as an internal memory such as a read only memory (ROM; e.g., electrically erasable programmable read-only memory (EEPROM)) or a random access memory (RAM), or implemented as a memory separate from the processor 130. In this case, the memory 110 may be implemented in the form of a memory embedded in the electronic apparatus 100 according to a data storage use, or in the form of a memory detachable from the electronic apparatus 100. For example, the data for the driving of the electronic apparatus 100 may be stored in a memory embedded to the electronic apparatus 100, and data for an expansion function of the electronic apparatus 100 may be stored in a memory detachable from the electronic apparatus 100.

The memory embedded in the electronic apparatus 100 may be implemented as at least one of a volatile memory (e.g., a dynamic RAM (DRAM), a static RAM (SRAM), or a synchronous dynamic RAM (SDRAM)), or a non-volatile memory (e.g., one time programmable ROM (OTPROM), programmable ROM (PROM), erasable and programmable ROM (EPROM), electrically erasable and programmable ROM (EEPROM), mask ROM, flash ROM, a flash memory (e.g., NAND flash or NOR flash), a hard disk drive (HDD) or a solid state drive (SSD)), and in the case of a memory attachable/detachable to the electronic apparatus 100, the memory may be implemented in a form such as, for example, and without limitation, a memory card (e.g., a compact flash (CF), a secure digital (SD), a micro secure digital (micro-SD), a mini secure digital (mini-SD), an extreme digital (xD), a multi-media card (MMC), etc.), an external memory (e.g., USB memory) connectable to a USB port, or the like.

The communication interface 120 may be a configuration configured to perform communication with an external apparatus of various types according to a communication method of various types. The communication interface 120 may include a WiFi module, a Bluetooth module, an infrared communication module, a wireless communication module, and the like. Here, the respective communication modules may be implemented in at least one hardware chip form.

The WiFi module and the Bluetooth module may be configured to perform communication in a WiFi method and a Bluetooth method, respectively. When using the WiFi module or the Bluetooth module, various connection information such as SSID and session key may be first transmitted and received, and after communicatively connecting using the above, various information may be transmitted and received.

The infrared communication module may perform communication according to an infrared data association (IrDA) technology of transmitting data wirelessly at a short range by using infrared rays present between visible light and millimeter waves.

The wireless communication module may include at least one communication chip configured to perform communication according to various wireless communication standards such as, for example, and without limitation, ZigBee, 3rd Generation (3G), 3rd Generation Partnership Project (3GPP), Long Term Evolution (LTE), LTE Advanced (LTE-A), 4th Generation (4G), 5th Generation (5G), and the like in addition to the above-described communication method.

Additionally, the communication interface 120 may include at least one from among a wired communication module performing communication by using a local area network (LAN) module, an Ethernet module, a pair cable, a coaxial cable, an optical fiber cable, an ultra wide-band (UWB) module, or the like.

According to an embodiment, the communication interface 120 may be configured to use an external device such as a remote controller and a same communication module (e.g., WiFi module) to communication with an external server.

According to another example, the communication interface 120 may be configured to use an external device such as a remote controller and a different communication module (e.g., WiFi module) to communication with an external server. For example, the communication interface 120 may be configured to use at least one from among the Ethernet module or the WiFi module to communicate with the external server, and use a BT module to communication with the external device such as the remote controller. However, this is merely one embodiment, and the communication interface 120 may be configured to use at least one communication module from among various communication modules when communicating with a plurality of external devices or the external server.

The processor 130 may be configured to perform an overall control operation of the electronic apparatus 100. Specifically, the processor 130 may function to control the overall operation of the electronic apparatus 100.

The processor 130 may be implemented as a digital signal processor (DSP) for processing a digital image signal, a microprocessor, and a time controller (TCON). However, the embodiment is not limited thereto, and may include, for example, and without limitation, one or more from among a central processing unit (CPU), a micro controller unit (MCU), a micro processing unit (MPU), a controller, an application processor (AP), a graphics-processing unit (GPU), a communication processor (CP), an ARM processor, or the like, or may be defined by the corresponding term. In addition, the processor 130 may be implemented as a System on Chip (SoC) or a large scale integration (LSI) in which a processing algorithm is embedded, and may be realized in the form of a field programmable gate array (FPGA). In addition, the processor 130 may be configured to perform various functions by executing computer executable instructions stored in the memory 110.

According to an embodiment to achieve the above-identified object, the electronic apparatus 100 may be configured to control the communication interface 120 to receive a first certificate which includes first certification information and a first electronic signature corresponding to the first certification information from a first server (app server 210) and store in the memory 110, receive a second certificate which includes second certification information and a second electronic signature corresponding to the second certification information from a second server (certificate authority server 220) and store in the memory 110, obtain first hash data by decrypting the first electronic signature using a public key of the second server (certificate authority server 220) in which the second certification information is included, obtain second hash data by converting the first certification information, verify the first server (app server 210) based on the first hash data and the second hash data, and based on the verification of the first server (app server 210) being identified as successful, transmit the request signal for the app data to the first server (app server 210).

The app data may mean data associated with an app to be installed in the processor 130. In an example, app data may be an app basic data. Here, the app basic data may mean an installation file for installing an app. In another example, the app data may be an app update data. Here, the app update data may be data for updating an app which is already installed.

The processor 130 may verify a reliability of a server to receive app data. A target of reliability verification may be the first server (app server 210) itself, or an app data providing server 211 corresponding to the first server (app server 210).

Here, the first certificate may mean a certificate of the certificate authority, and the second certificate may mean a root certificate. The detailed description on the certificate of the certificate authority and the root certificate will be described below in FIG. 5.

Here the first certificate (certificate of the certificate authority) and the second certificate (root certificate) may be a certificate generated in the same server. For example, the first certificate (certificate of the certificate authority) and the second certificate (root certificate) may be generated in a certificate authority server 220. The processor 130 may be configured to receive the first certificate (certificate of the certificate authority) and the second certificate (root certificate) from different servers.

According to an embodiment, the processor 130 may be configured to receive the first certificate (certificate of the certificate authority) from the first server (app server 210), and receive the second certificate (root certificate) from the second server (certificate authority server 220).

According to another embodiment, the processor 130 may be configured to receive the first certificate (certificate of the certificate authority) from the first server (app server 210), and receive the second certificate (root certificate) from a third server (manufacturer server 230). Specifically, the second server (certificate authority server 220) may be configured to transmit, after generating the second certificate (root certificate), the second certificate (root certificate) to the third server (manufacturer server 230), and the third server (manufacturer server 230) may be configured to transmit the received second certificate (root certificate) to the electronic apparatus 100.

The operation on receiving the first certificate (the certificate of the certificate authority) and the second certificate (the root certificate) will be described in detail below in FIG. 6.

A reliability verification method may be a method using a certificate. For example, the reliability verification on a server which provides the app data requested by the electronic apparatus 100 may be performed through a certificate. The first server (app server 210) which provides the app data may receive the certificate (first certificate) issued from a certificate authority and provide to the electronic apparatus 100. Here, the certificate authority may include an encrypted first electronic signature in the certificate (first certificate) issued by the certificate authority. Further, the second server (certificate authority server 220) may be configured to separately generate the second certificate (root certificate) which includes a public key of the second server (certificate authority server 220) necessary for decrypting the encrypted first electronic signature and transmit to the electronic apparatus 100. Here, the electronic apparatus 100 may check whether data is match by comparing the first certificate (certificate of the certificate authority) received from the first server (app server 210) with the second certificate (root certificate) received without going through the first server (app server 210). When data obtained from the first certificate (certificate of the certificate authority) and data obtained from the second certificate (root certificate) is a match, the processor 130 may be configured to identify the reliability verification on the first server (app server 210) as a success. In addition, when data obtained from the first certificate (certificate of the certificate authority) and data obtained from the second certificate (root certificate) is not a match, the processor 130 may be configured to identify the reliability verification on the first server (app server 210) as a failure.

Here, the processor 130 may be configured to obtain the public key of the second server (certificate authority server 220) by analyzing the second electronic signature and the second certification information included in the second certificate (root certificate).

According to an embodiment, the processor 130 may be configured to decrypt the first electronic signature included in the first certificate (certificate of the certificate authority) by immediately using the public key of the second server (certificate authority server 220) included in the second certification information.

According to another embodiment, the processor 130 may be configured to obtain hash data by decrypting the second electronic signature included in the second certificate (root certificate) with the public key of the second server (certificate authority server 220) included in the second certification information. Further, the processor 130 may be configured to convert the second certification information to hash data by using a hash function. The processor 130 may be configured to verify the public key of the second server (certificate authority server 220) by comparing the hash data obtained by a decryption operation and the hash data obtained by a conversion operation using the hash function. Further, based on the hash data matching by a comparison operation, the processor 130 may be configured to identify the verification of the public key of the second server (certificate authority server 220) as a success. Based on the verification of the public key of the second server (certificate authority server 220) being a success, the processor 130 may be configured to decrypt the first electronic signature with the public key of the second server (certificate authority server 220).

Here, the first hash data may mean a result value of the first electronic signature being decrypted by the public key of the second server (certificate authority server 220), and the second hash data may mean a result value of the first certification information being converted by the hash function.

The operation of performing verification by using the first hash data and the second hash data will be described in detail below in FIG. 9.

The processor 130 may be configured to identify, based on the first hash data and the second hash data being a match, the verification of the first server (app server 210) as a success, and control the communication interface 120 to transmit, based on the verification of the first server (app server 210) being identified as a success, a request signal for address information to receive app data to the first server (app server 210).

Here, the address information may mean address information of a server for downloading app data. The first server (app server 210) may be realized in the form of directly transmitting the app data, but the app data may be provided from a separate server (app data providing server 211) and not the first server (app server 210). The address information may include an address value, and the address value may mean an internet address or a Uniform Resource Locator (URL) information to provide app data.

The electronic apparatus 100 may be configured to perform the reliability verification on the address information provided from the first server (app server 210). Specifically, the processor 130 may be configured to request an electronic signature (a third electronic signature) generated from a pre-determined external server with respect to the address value included in the address information. In an example, the third electronic signature on the address value may be generated from the second server (certificate authority server 220), and in another example, the third electronic signature on the address value may be generated from the third server (manufacturer server 230). A specific address value verification system may be provided according to the intent of a user implementing the system.

In an example, the third electronic signature being generated in the second server (certificate authority server 220) may be described.

The processor 130 may be configured to receive address information including the address value and the third electronic signature corresponding to the address value from the first server (app server 210), obtain a third hash data by decrypting the third electronic signature using the public key of the second server (certificate authority server 220), obtain a fourth hash data by converting the address value included in the address information, and based on the third hash data and the fourth hash data being a match, request app data to the address value.

The third electronic signature may include a hash value of the address value encrypted with a private key of the second server (certificate authority server 220).

The processor 130 may be configured to obtain the third hash data which includes the hash value of the address value by decrypting the third electronic signature with the public key of the second server (certificate authority server 220), and obtain the fourth hash data corresponding to the address value included in the address information by using the hash function.

The additional operation on the embodiment in which the third electronic signature is generated from the second server (certificate authority server 220) may be described below in FIG. 10 and FIG. 11.

In another example, the additional operation on an embodiment in which the third electronic signature is generated from the third server (manufacturer server 230) may be described below in FIG. 12 and FIG. 13.

The first electronic signature may include a hash value of a public key of the first server (app server 210) which is encrypted with the private key of the second server (certificate authority server 220) and a hash value of first additional information, and the first certification information may include a public key of the first server (app server 210) and first additional information, and the first additional information may include an application subject of the first certificate (certificate of the certificate authority) and a validity period of the first certificate (certificate of the certificate authority).

Here, because the first electronic signature is an encryption of the hash value of information included in the first certification information, the first electronic signature may correspond to the first certification information.

The processor 130 may be configured to obtain the first hash data including the hash value of the public key of the first server (app server 210) and the hash value of the first additional information by decrypting the first electronic signature included in the first certificate (certificate of the certificate authority) with the public key of the second server (certificate authority server 220) included in the received second certificate (root certificate), and obtain the public key of the first server (app server 210) included in the first certificate (certificate of the certificate authority) and the second hash data corresponding to the first additional information by using the hash function.

The second electronic signature may include the hash value of the public key of the second server (certificate authority server 220) which is encrypted with the private key of the second server (certificate authority server 220) and a hash value of a second additional information, the second certification information may include the public key of the second server (certificate authority server 220) and the second additional information, and the second additional information may include an application subject of the second certificate (root certificate) and a validity period of the second certificate (root certificate).

Here, because the second electronic signature is an encryption of a hash value of information included in the second certification information, the second electronic signature may correspond to the second certification information.

The application subject of the first certificate (certificate of the certificate authority) and the application subject of the second certificate (root certificate) may be different. For example, the first certificate (certificate of the certificate authority) may be such that the first server (app server 210) is the application subject, but the second certificate (root certificate) may be such that the second server (certificate authority server 220) is the application subject. Because the second certificate (root certificate) is a certificate generated for the purpose of proving certification of the first certificate (certificate of the certificate authority), the application subject may be different from the first certificate (certificate of the certificate authority).

The processor 130 may be configured to control the communication interface 120 to transmit a control signal questioning whether the certificate which is not stored in a pre-stored certificate list can be identified to the third server (manufacturer server 230) based on a pre-set event.

The pre-set event may be an event in which a user command to install an app is received or an event in which a control instruction requesting update data on a pre-installed app is obtained. The control instruction requesting the update data may be obtained at a pre-determined interval.

The processor 130 may be configured to identify that the electronic apparatus 100 needs app data based on the pre-set event. Further, based on identifying that app data is needed, the processor 130 may be configured to generate the control signal questioning whether a new root certificate is received, and transmit the generated control signal to the third server (manufacturer server 230).

The third server (manufacturer server 230) may be configured to store a plurality of root certificates associated with the electronic apparatus 100. Further, based on the second certificate (root certificate) being received from the second server (certificate authority server 220), whether the second certificate (root certificate) which is received in the pre-stored root certificate list is included may be identified. If the second certificate (root certificate) which is received in the pre-stored root certificate list is included, the third server (manufacturer server 230) may not perform a separate operation. If the second certificate (root certificate) which is received in the pre-stored root certificate list is included, the third server (manufacturer server 230) may be configured to update the root certificate list by adding the second certificate (root certificate) received from the second server (certificate authority server 220) to the pre-stored root certificate list. Further, the third server (manufacturer server 230) may be configured to transmit, separately from a list update, the added second certificate (root certificate) to the electronic apparatus 100.

According to an embodiment, based on a new second certificate (root certificate) being received, the third server (manufacturer server 230) has been described as transmitting the second certificate (root certificate) to the electronic apparatus 100.

According to another embodiment, the third server (manufacturer server 230) may be configured to transmit, based on a pre-determined control signal being received, the added second certificate (root certificate) to the electronic apparatus. Here, the pre-determined control signal may be a control signal questioning whether the certificate which is not stored in the pre-stored certificate list can be identified.

According to an embodiment, the electronic apparatus 100 may perform the reliability verification on the server providing app data through the certificate. Here, the electronic apparatus 100 may receive only the root certificate generated in the second server (certificate authority server 220) individually. The root certificate may take a long time because the plurality of root certificates is also received when receiving in the firmware update method. Accordingly, the electronic apparatus 100 according to an embodiment may save time by receiving one root certificate individually. The method of the present disclosure may be easier to perform reliability verification compared to the firmware update in that data processing rate may become faster and cost may be lowered in addition to the time.

According to an embodiment, the electronic apparatus 100 may additionally perform reliability verification on the address value of the server providing app data in addition to reliability verification through the certificate. Based on additionally performing reliability verification on the address value after performing reliability verification of a specific server using the certificate, reliability of the server providing app data may be increased.

In the above, although only a simple configuration comprising the electronic apparatus 100 has been illustrated and described, various configurations may be additionally provided at implementation. The above will be described below with reference to FIG. 4.

Figure 4:
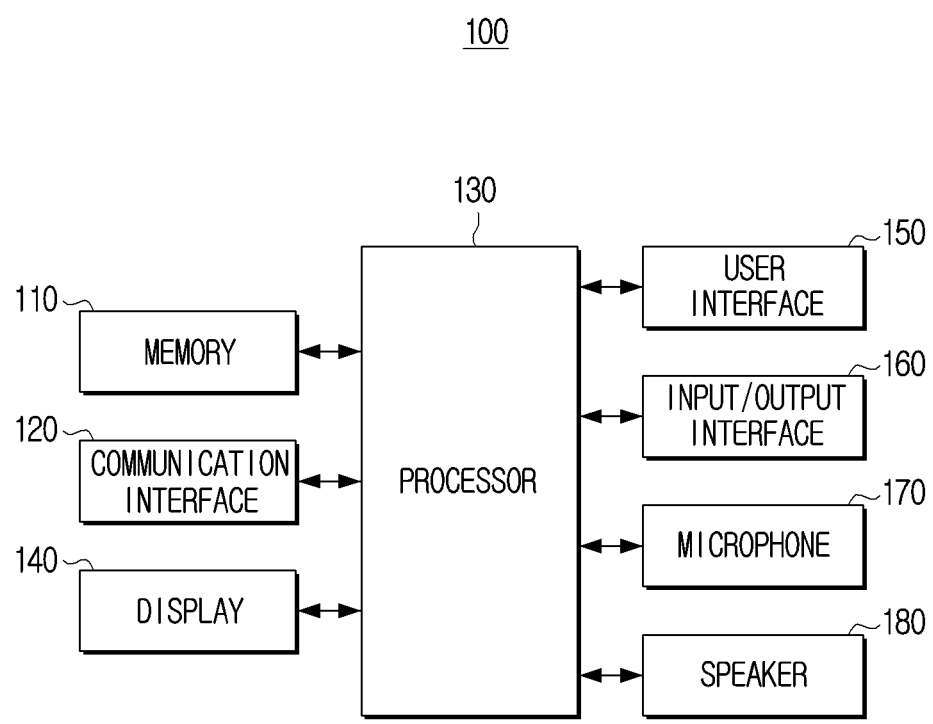
FIG. 4 is a block diagram illustrating a detailed configuration of the electronic apparatus of FIG. 3.

FIG. 4 is a block diagram illustrating a detailed configuration of the electronic apparatus of FIG. 3.

Referring to FIG. 4, the electronic apparatus 100 may be comprised of the memory 110, the communication interface 120, the processor 130, a display 140, a user interface 150, an input and output interface 160, a microphone 170, and a speaker 180.

Redundant descriptions on operations which are the same as those described in the above from among the operations of the memory 110, the communication interface 120, and the processor 130 will be omitted.

The display 140 may be implemented as a display of various forms such as, for example, and without limitation, a liquid crystal display (LCD), an organic light emitting diode (OLED) display, a plasma display panel (PDP), or the like. In the display 140, a driving circuit which may be implemented in the form of an a-si TFT, a low temperature poly silicon (LTPS) TFT, an organic TFT (OTFT), or the like, a backlight unit, and the like may be included. The display 140 may be implemented as a touch screen coupled with a touch sensor, a flexible display, a 3D display, and the like.

According to an embodiment, the display 140 may include not only a display panel outputting an image, but also a bezel housing the display panel. Specifically, according to an embodiment, the bezel may include a touch sensor (not shown) for detecting user interaction.

The user interface 150 may be implemented as a device such as a button, a touch pad, a mouse, and a keyboard, or may be implemented as a touch screen capable of performing the display function as well as an operation input function. Here, the button may be a button of various types such as, for example, and without limitation a mechanical button, a touch pad, a wheel, and the like which are formed at a random area such as a front surface part, a side surface part, a rear surface part of a main body exterior of the electronic apparatus 100.

The input and output interface 160 may be any one interface from among a high-definition multimedia interface (HDMI), a mobile high-definition link (MHL), a universal serial bus (USB), display port (DP), a Thunderbolt, a video graphics array (VGA) port, a RGB port, a D-subminiature (D-SUB), or a digital visual interface (DVI).

The input and output interface 160 may input and output at least one from among an audio signal and a video signal.

According to an embodiment, the input and output interface 160 may include a port inputting and outputting only the audio signal and a port inputting and outputting only the video signal as separate ports, or may be implemented as one port inputting and outputting both the audio signal and the video signal.

The electronic apparatus 100 may further include a microphone 170. The microphone may be a configuration for receiving a user voice or other sounds to convert to audio data.

The microphone 170 may be configured to receive the user voice in an activated state. For example, the microphone 170 may be integrally formed at a top side or front surface direction, a side surface direction or the like of the electronic apparatus 100. The microphone 170 may include various configurations such as a microphone configured to collect the user voice in an analog form, an amplifier configured to amplify the collected user voice, an A/D converter circuit configured to convert the amplified user voice to a digital signal by sampling, a filter circuit configured to remove a noise component from the converted digital signal, and the like.

The electronic apparatus 100 may include a speaker 180. The speaker 180 may be an element configured to output not only various audio data processed from the input and output interface, but also various notification sounds, voice messages, or the like.

Figure 5:
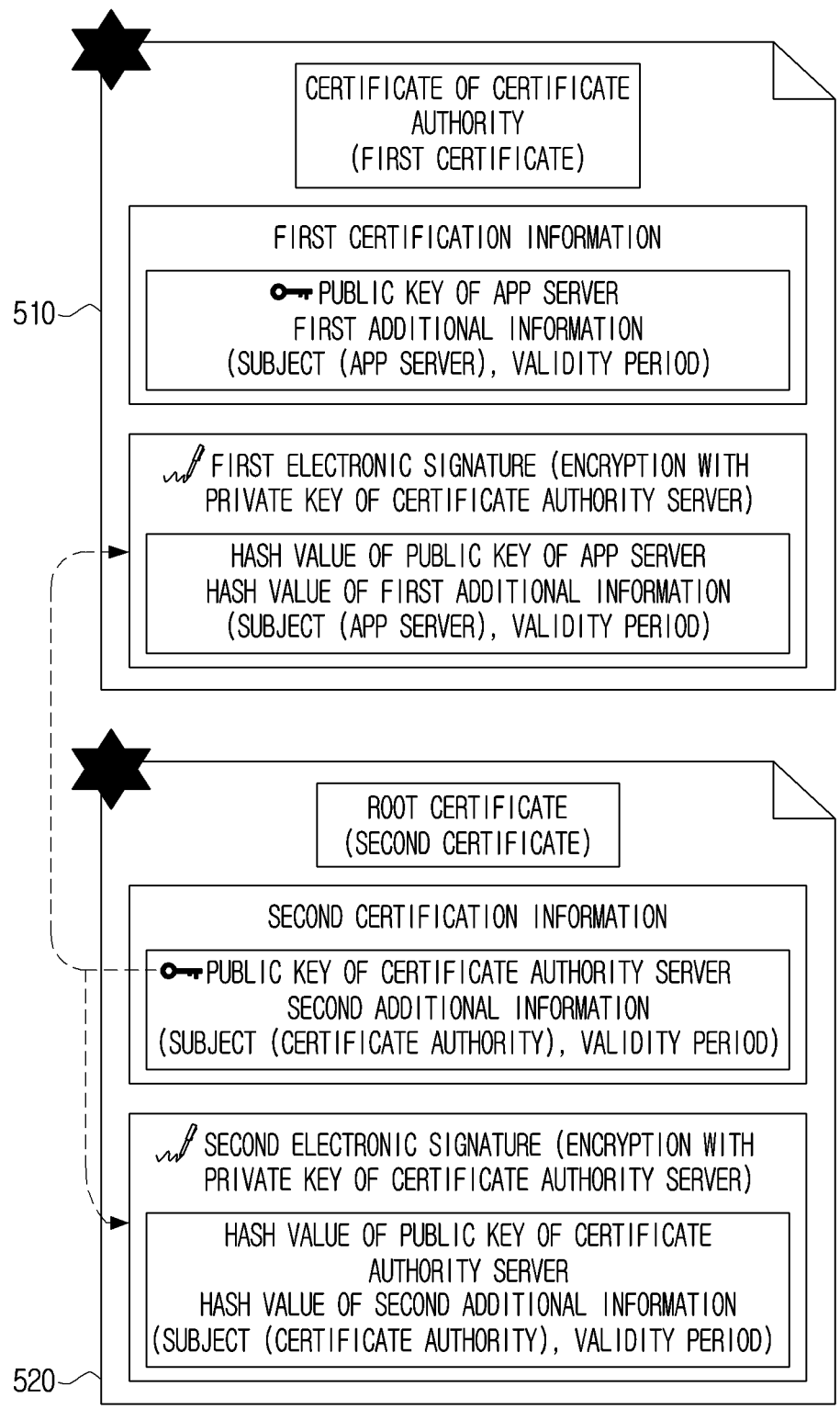
FIG. 5 is a diagram illustrating a certificate of a certificate authority and a root certificate.

FIG. 5 is a diagram illustrating a certificate of a certificate authority and a root certificate.

Referring to FIG. 5, the certificate of the certificate authority and the root certificate may be generated (or, issued) from the certificate authority server 220.

The certificate of the certificate authority (first certificate) may include first certification information and a first electronic signature.

Here, the first certification information may include the public key of the app server 210 and first additional information. Here, the first additional information may include subject information and validity period information of the certificate of the certificate authority. Here, the subject that applied for the issuance of the certificate of the certificate authority may be the app server 210. Accordingly, the first additional information may include information that the app server 210 is the subject of the certificate of the certificate authority and validity period information.

Here, the first electronic signature may be information corresponding to the first certification information. Specifically, the first certification information may be converted to a hash value by the hash function. Further, the hash value of the first certification information may be encrypted with the private key of the certificate authority. The data of which the hash value of the first certification information is encrypted may correspond to the first electronic signature. Specifically, the first electronic signature may mean the data (or, information) of which the hash value of the public key of the app server and the hash value of the first additional information (subject (app server, 210), validity period) are encrypted with the private key of the certificate authority. Because the first electronic signature is in an encrypted state with the private key of the certificate authority, a public key corresponding to the private key of the certificate authority may be needed to check the content of the first electronic signature.

The root certificate (second certificate) may include the second certification information and the second electronic signature.

Here, the second certification information may include the public key of the certificate authority server 220 and the second additional information. Here, the second additional information may include the subject information and validity period information of the certificate of the certificate authority. Here, the subject that applied for the issuance of the certificate of the certificate authority may be the certificate authority server 220. Accordingly, the second additional information may include information that the certificate authority server 220 is the subject of the certificate of the certificate authority and the validity period information.

Here, the second electronic signature may be information corresponding to the second certification information. Specifically, the second certification information may be converted to a hash value by the hash function. Further, the hash value of the second certification information may be encrypted with the private key of the certificate authority. The data of which the hash value of the second certification information is encrypted may correspond to the second electronic signature. Specifically, the second electronic signature may mean data (or, information) of which the hash value of the public key of the app server and the hash value of the second additional information (subject (certificate authority server 220), validity period) are encrypted with the private key of the certificate authority. Because the second electronic signature is in an encrypted state with the private key of the certificate authority, a public key corresponding to the private key of the certificate authority may be needed to check the content of the second electronic signature.

Figure 6:
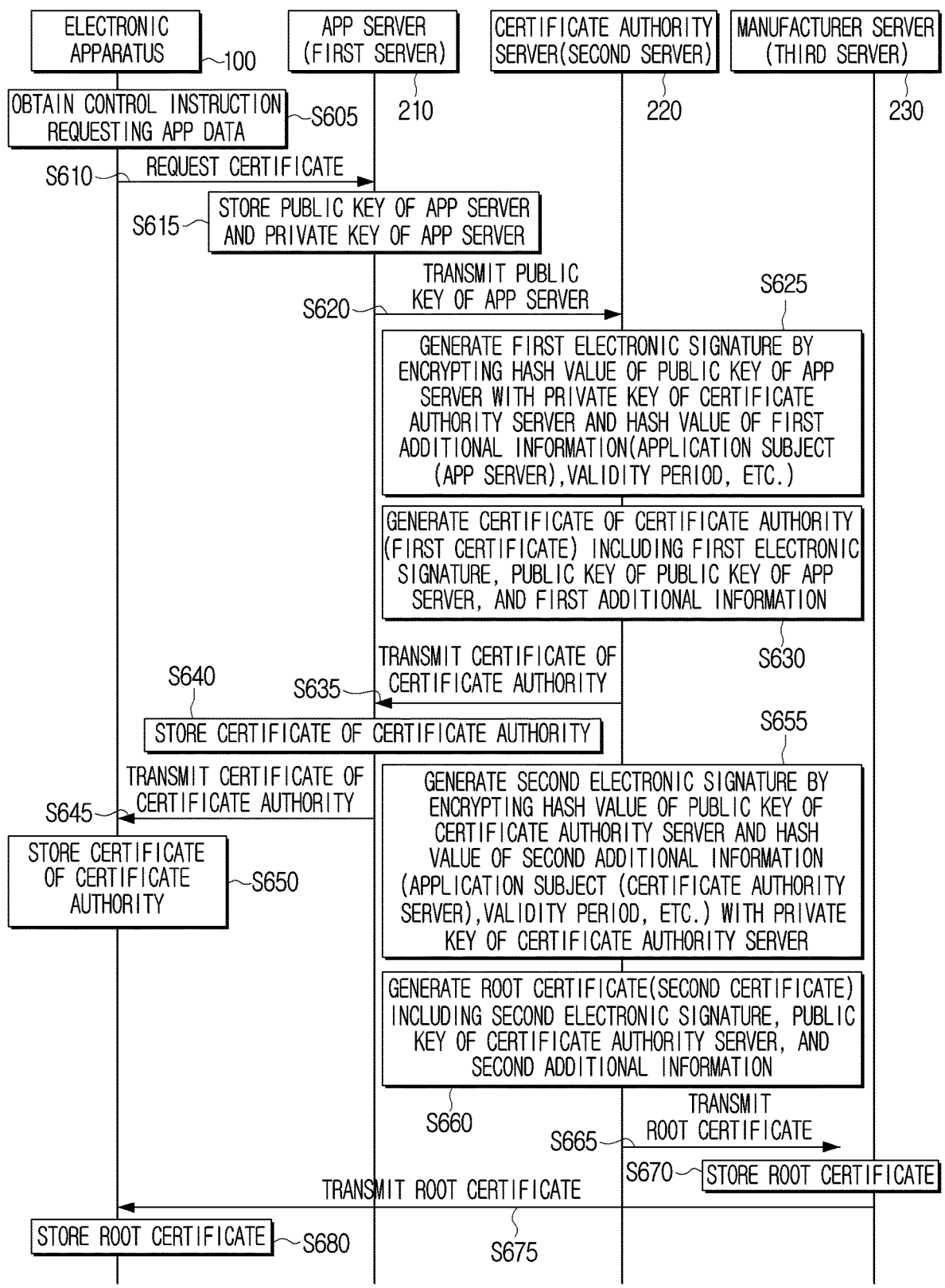
FIG. 6 is a flowchart illustrating an operation of an electronic apparatus receiving a certificate of a certificate authority and a root certificate according to an embodiment.

FIG. 6 is a flowchart illustrating an operation of an electronic apparatus receiving a certificate of a certificate authority and a root certificate according to an embodiment.

Referring to FIG. 6, the electronic apparatus 100 may obtain the control instruction requesting the app data (S605). Further, electronic apparatus 100 may transmit a request for a certificate based on the obtained control instruction to the app server 210 (S610). Further, the app server or the first server 210 may be configured to store the public key of the app server 210 and the private key of the app server 210 (S615). Here, the public key of the app server 210 and the private key of the app server 210 may be a key forming a pair. Further, the app server 210 may be configured to transmit the public key of the app server 210 to the certificate authority server 220 (S620). Specifically, the app server 210 may be configured to additionally transmit the public key of the app server 210 together with information necessary in generating a certificate to the certificate authority server 220.

Further, the certificate authority server 220 may be configured to store the public key of the app server 210 and the first additional information (application subject (app server, 210), validity period). In addition, the certificate authority server 220 may be configured to obtain the hash value of the public key of the app server 210 and the hash value of the first additional information (application subject (app server, 210), validity period) by using the hash function. Further, the certificate authority server 220 may be configured to generate (or, obtain) the first electronic signature by encrypting the hash value of the public key of the app server 210 and the hash value of the first additional information (application subject (app server, 210), validity period) with the private key of the certificate authority server 220 (S625).

Further, the certificate authority server 220 may be configured to generate the certificate of the certificate authority (first certificate) including the first electronic signature, the public key of the app server 210, and the first additional information (application subject (app server, 210), validity period) (S630). Further, the certificate authority server 220 may be configured to transmit the generated certificate of the certificate authority to the app server 210 (S635). Further, the app server 210 may be configured to store the certificate of the certificate authority received from the certificate authority server 220 (S640). Further, the app server 210 may be configured to transmit the certificate of the certificate authority to the electronic apparatus 100 (S645). Further, the electronic apparatus 100 may store the certificate of the certificate authority received from the app server 210 (S650).

The certificate authority server 220 may be configured to additionally generate the root certificate in addition to the generating of the certificate of the certificate authority. Specifically, the certificate authority server 220 may be configured to store the public key of the certificate authority server 220 and the second additional information (application subject (certificate authority server 220), validity period). Further, the certificate authority server 220 may be configured to obtain the hash value of the public key of the certificate authority server 220 and the hash value of the second additional information (application subject (certificate authority server 220), validity period) by using the hash function. Further, the certificate authority server 220 may be configured to generate (or, obtain) the second electronic signature by encrypting the hash value of the public key of the certificate authority server 220 and the hash value of the second additional information (application subject (certificate authority server 220), validity period) with the private key of the certificate authority server 220 (S655).

Further, the certificate authority server 220 may be configured to generate the root certificate (second certificate) including the second electronic signature, the public key of the certificate authority server 220, and the second additional information (application subject (certificate authority server 220), validity period) (S660). Further, the certificate authority server 220 may be configured to transmit the generated root server to the manufacturer server 230 (S665). Further, the manufacturer server 230 may be configured to store the received root certificate (S670). Further, the manufacturer server 230 may be configured to transmit the root certificate to the electronic apparatus 100 (S675). Further, the electronic apparatus 100 may store the root certificate (S680).

The electronic apparatus 100 may be configured to receive the certificate of the certificate authority through the app server 210, and receive the root certificate through the manufacturer server 230. However, according to an embodiment, the electronic apparatus 100 may receive the root certificate directly from the certificate authority server 220 without going through the manufacturer server 230.

Figure 7:
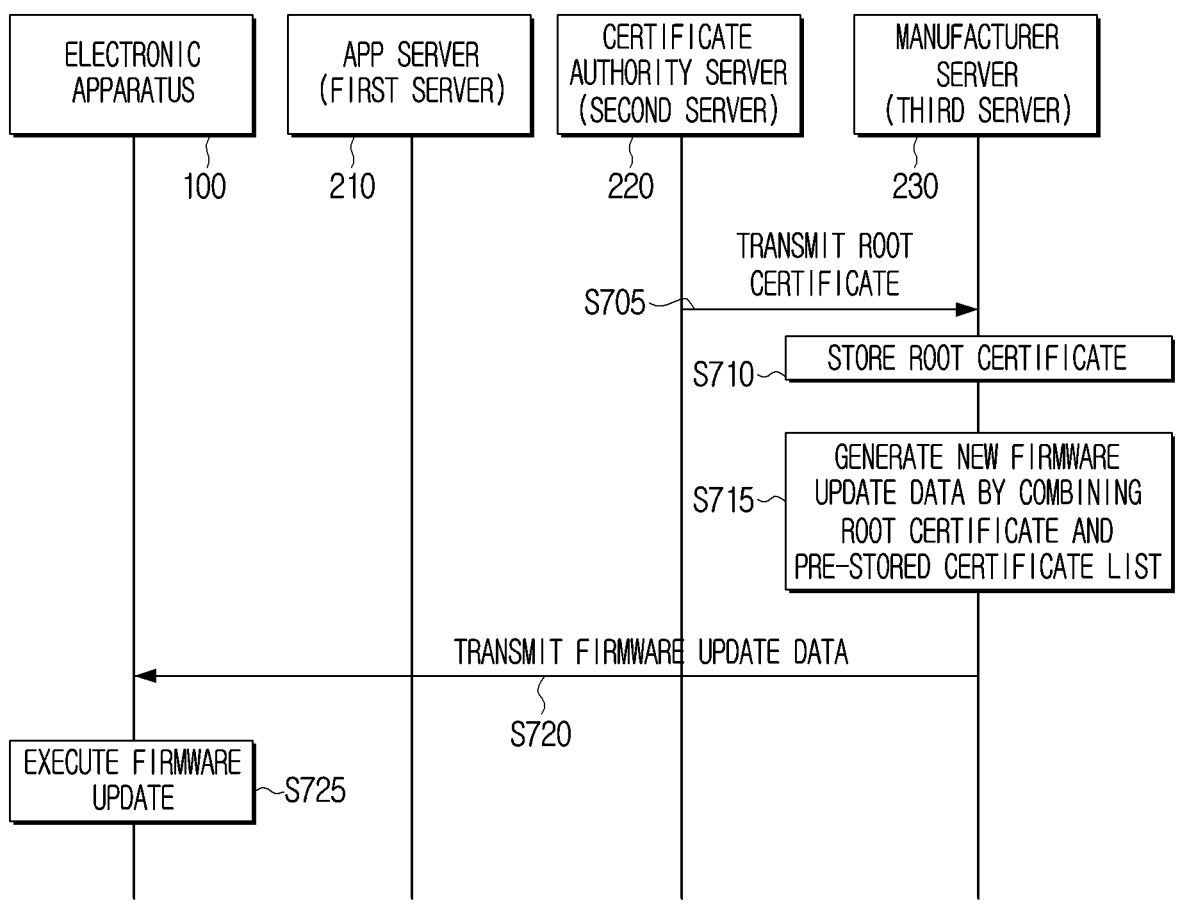
FIG. 7 is a flowchart illustrating an operation of an electronic apparatus receiving a root certificate according to an embodiment.

FIG. 7 is a flowchart illustrating an operation of an electronic apparatus receiving a root certificate according to an embodiment.

Referring to FIG. 7, the certificate authority server 220 may be configured to transmit the root certificate to the manufacturer server 230 (S705). Further, the manufacturer server 230 may be configured to store the root certificate (S710). Here, operations S705 and S715 may correspond with operations S665 and S670.

Further, the manufacturer server 230 may be configured to generate a new firmware update data by combining the root certificate and the pre-stored certificate list (S715). Further, the manufacturer server 230 may be configured to transmit the firmware update data to the electronic apparatus 100 (S720). Further, the electronic apparatus 100 may execute the firmware update based on the received data (S725).

Figure 8:
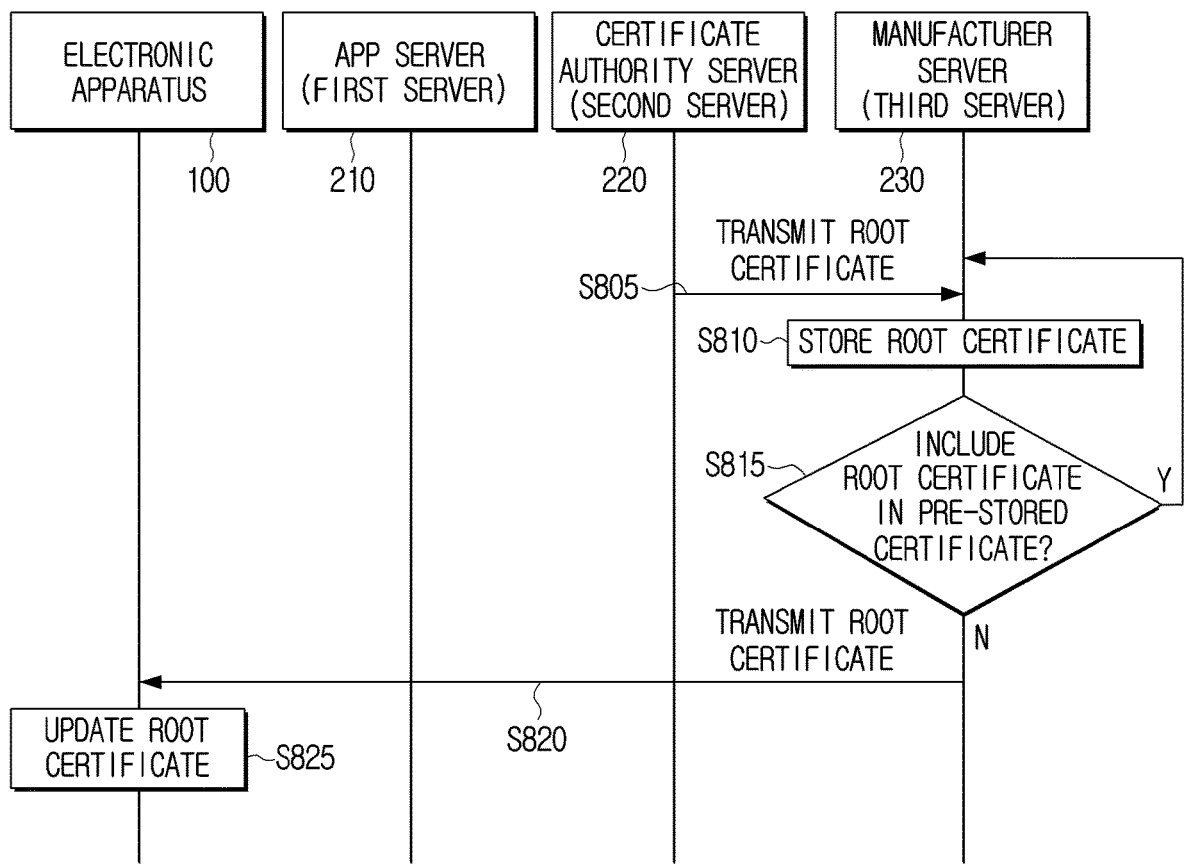
FIG. 8 is a flowchart illustrating an operation of an electronic apparatus receiving a root certificate according to another embodiment.

FIG. 8 is a flowchart illustrating an operation of an electronic apparatus receiving a root certificate according to another embodiment.

Referring to FIG. 8, the certificate authority server 220 may be configured to transmit the root certificate to the manufacturer server 230 (S805), and the manufacturer server 230 may be configured to store the root certificate (S810). Here, operations S805 and S810 may correspond with operations S665 and S670.

Further, the manufacturer server 230 may be configured to identify whether the root certificate is included in the pre-stored at least one certificate. Based on the root certificate being included in the pre-stored at least one certificate, the manufacturer server 230 may repeat operations S805 to S815. Based on the root certificate not being included in the pre-stored at least one certificate, the manufacturer server 230 may be configured to transmit the received root certificate to the electronic apparatus 100 (S820). Further, the electronic apparatus 100 may store (or update) the root certificate (S825). Here, the electronic apparatus 100 may perform an update by receiving only the newly generated root certificate and not the firmware update unlike the embodiment of FIG. 7.

In the embodiment of FIG. 7, a firmware update which includes all the existing certificates is generated, but in the embodiment of FIG. 8, because only the added root certificate is updated, time and cost may be saved.

Figure 9:
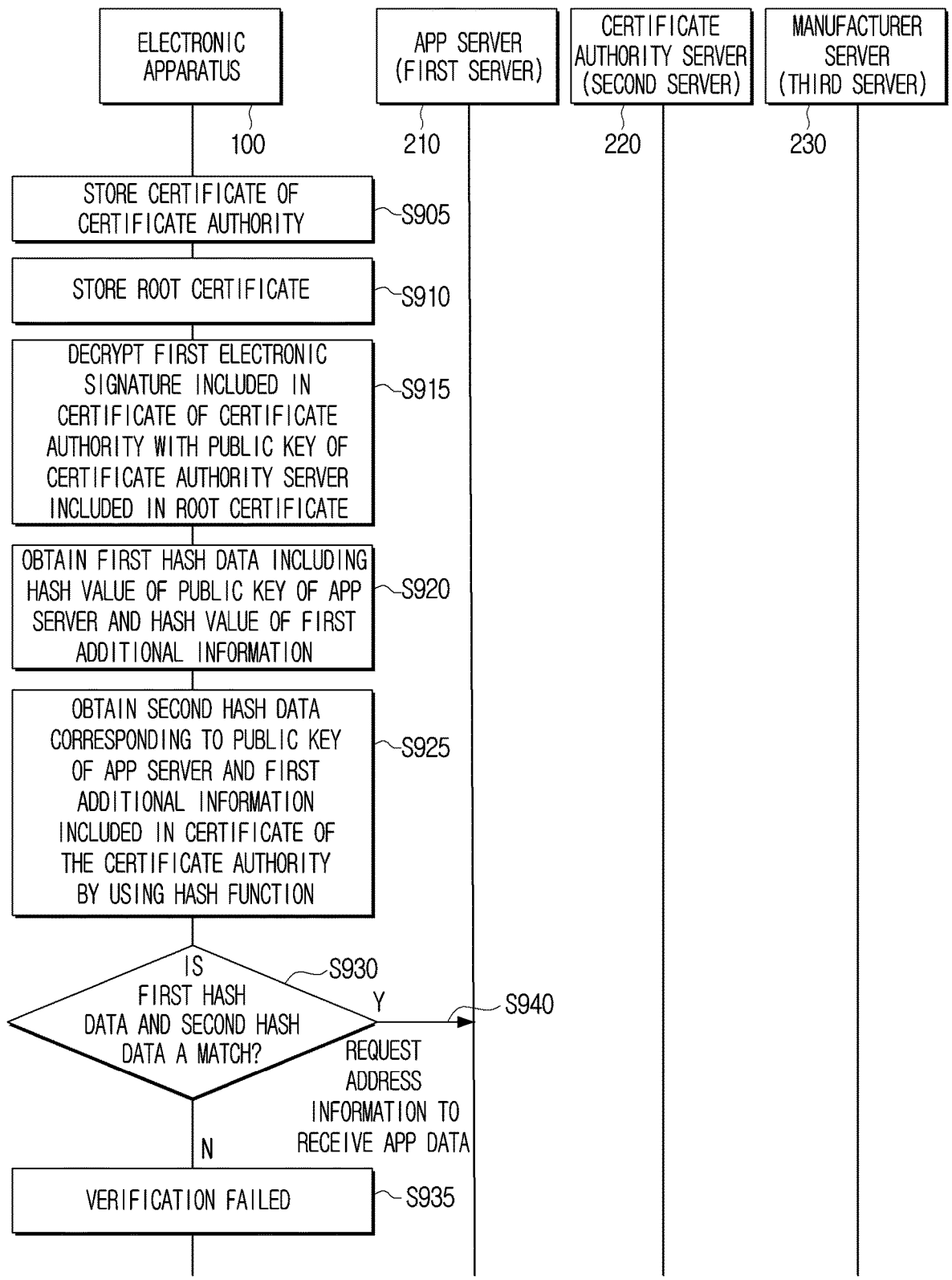
FIG. 9 is a flowchart illustrating an operation of an electronic apparatus performing a certificate verification for server verification according to an embodiment.

FIG. 9 is a flowchart illustrating an operation of an electronic apparatus performing a certificate verification for server verification according to an embodiment.

Referring to FIG. 9, the electronic apparatus 100 may store the certificate of the certificate authority (S905), and store the root certificate (S910). Here, operations S905 and S910 may correspond with operations S650 and S680.

Further, the electronic apparatus 100 may decrypt the first electronic signature included in the certificate of the certificate authority with the public key of the certificate authority server 220 included in the root certificate (S915). Further, the electronic apparatus 100 may obtain first hash data including the hash value of the public key of the app server 210 and the hash value of the first additional information by the decryption operation in operation S915 (S920). Further, the electronic apparatus 100 may obtain second hash data corresponding to the public key of the app server 210 and the first additional information included in the certificate of the certificate authority (specifically, second certification information) by using the hash function (S925).

Further, the electronic apparatus 100 may identify whether the first hash data and the second hash data are a match (S930). Specifically, the electronic apparatus 100 may perform the reliability verification of the app server 210 based on the first hash data and the second hash data. If the first hash data and the second hash data are not a match, the electronic apparatus 100 may identify the reliability verification of the app server 210 as having failed (S935). If the first hash data and the second hash data are a match, the electronic apparatus 100 may identify as the reliability verification of the app server 210 as having succeeded, and generate a control instruction requesting address information to receive the app data. Further, the electronic apparatus 100 may transmit the generated control instruction to the app server 210 (S940).

Figure 10:
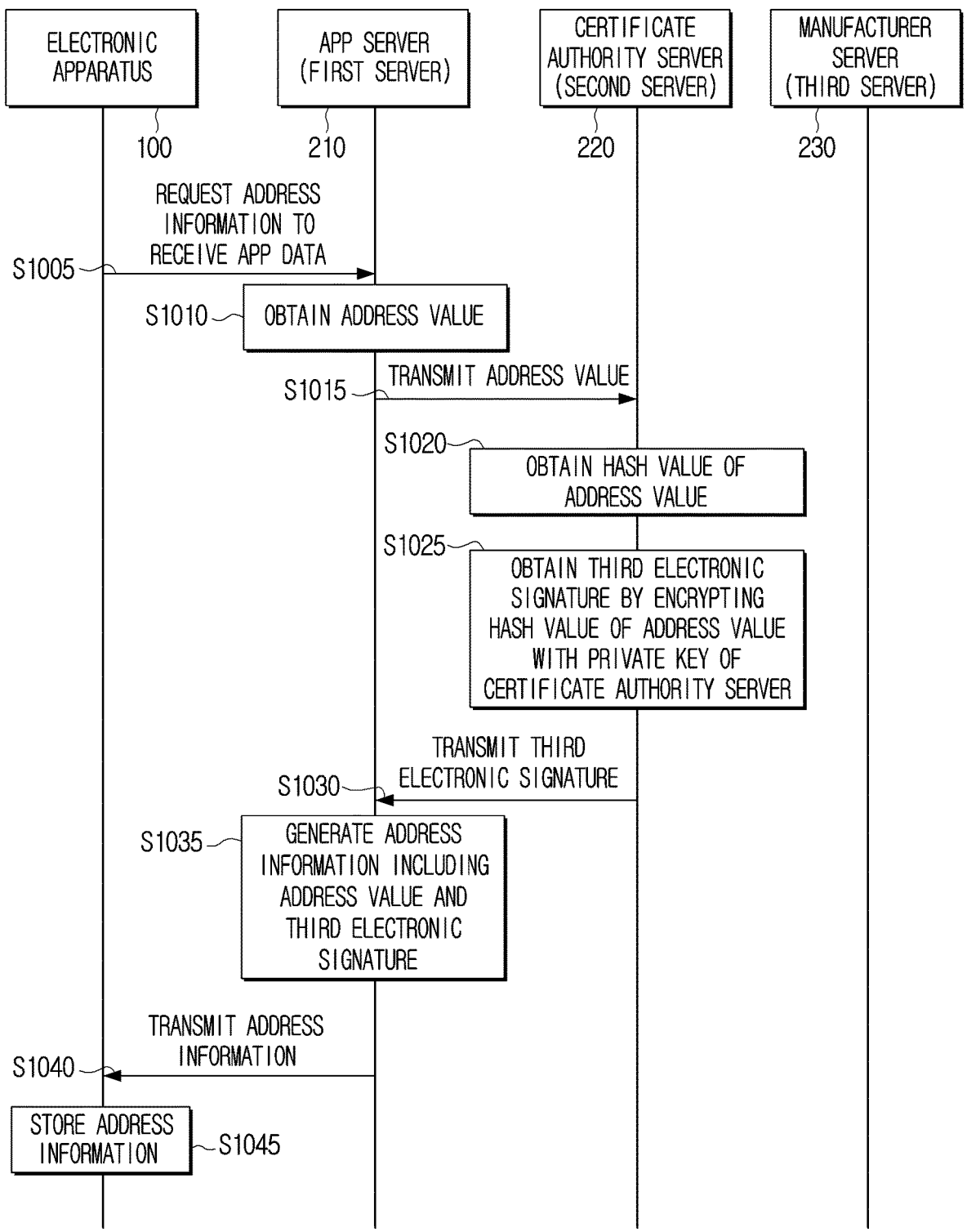
FIG. 10 is a flowchart illustrating an operation of an electronic apparatus obtaining address information according to an embodiment.

FIG. 10 is a flowchart illustrating an operation of an electronic apparatus obtaining address information according to an embodiment.

Referring to FIG. 10, the electronic apparatus 100 may transmit the request for address information to receive the app data to the app server 210 (S1005). Here, operation S1005 may correspond with operation S940.

Further, the app server 210 may be configured to obtain the address value of the server used in transmitting the app data (S1010). Further, the app server 210 may be configured to transmit the obtained address value to the certificate authority server 220 (S1015).

Further, the certificate authority server 220 may be configured to convert the address value received from the app server 210 to a hash value of the address value by using the hash function. The certificate authority server 220 may be configured to obtain the hash value of the address value (S1020). Further, the certificate authority server 220 may be configured to obtain the third electronic signature by encrypting the hash value of the address value with the private key of the certificate authority server 220 (S1025). Further, the certificate authority server 220 may be configured to transmit the third electronic signature to the app server 210 (S1030.)

Further, the app server 210 may be configured to generate the address information including the address value and the third electronic signature (S1035). Further, the app server 210 may be configured to transmit the generated address information to the electronic apparatus 100 (S1040). Further, the electronic apparatus 100 may store the received address information (S1045).

According to an embodiment, based on the subject generating the third electronic signature (encryption of the hash value of the address value) being the second server (certificate authority server 220), the electronic apparatus 100 may be configured to perform decryption of the hash value of the address value encrypted by using the public key of the second server (certificate authority server 220) which was used in the certificate verification. Here, because the second server (certificate authority server 220) issues the certificate and also certifies the address value, the electronic apparatus 100 may perform verification of both the first server (app server 210) from the one certificate authority and the address value provided from the first server (app server 210). When verifying several information from the one certificate authority, data processing amount and data processing time may be saved.

Figure 11:
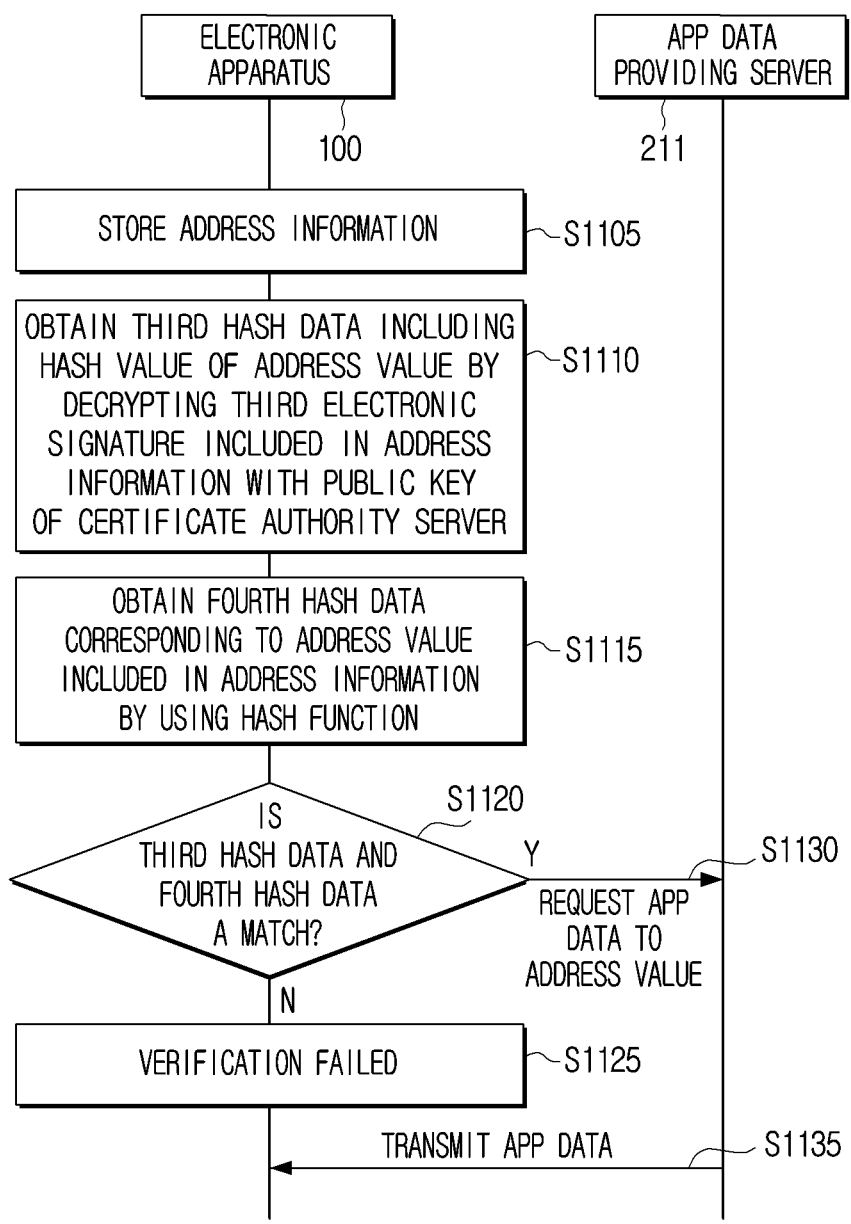
FIG. 11 is a flowchart illustrating an operation of the electronic apparatus of FIG. 10 performing an address verification for server verification.

FIG. 11 is a flowchart illustrating an operation of the electronic apparatus of FIG. 10 performing an address verification for server verification.

Referring to FIG. 11, the electronic apparatus 100 may store address information (S1105). Here, operation S1105 may correspond to operation S1045.

Further, the electronic apparatus 100 may obtain the third hash data including the hash value of the address value by decrypting the third electronic signature included in the address information using the public key of the certificate authority server 220 included in the root certificate (S1110). Specifically, the electronic apparatus 100 may perform decryption of the third electronic signature based on the public key of the certificate authority server 220, and obtain the third hash data of which the third electronic signature is decrypted.

Further, the electronic apparatus 100 may obtain the fourth hash data corresponding to the address value included in the address information by using the hash function (S1115). Specifically, in the address information, an address value which is not encrypted may be included in addition to the third electronic signature, and the electronic apparatus 100 may obtain the fourth hash data by converting the address value which is not encrypted by using the hash function.

Further, the electronic apparatus 100 may identify whether the third hash data and the fourth hash data are a match (S1120). The electronic apparatus 100 may perform reliability verification of the address value based on the third hash data and the fourth hash data. Based on the third hash data and the fourth hash data not being a match, the electronic apparatus 100 may identify the reliability verification of the address value as having failed (S1125). Based on the third hash data and the fourth hash data being a match, the electronic apparatus 100 may identify the reliability verification of the address value as having succeeded, and generate a control instruction requesting app data to the address value. Further, the electronic apparatus 100 may transmit the generated control instruction (app data request) to the app data providing server 211 corresponding to the address value (S1130). Further, the app data providing server 211 may be configured to transmit the app data to the electronic apparatus 100 (S1135).

The electronic apparatus 100 may additionally perform the reliability verification on the address value in addition to the verification of the app server 210 through the certificate. Accordingly, by additionally verifying the address value on the app data providing server 211 provided by the app server 210, reliability on the app data may be increased.

Figure 12:
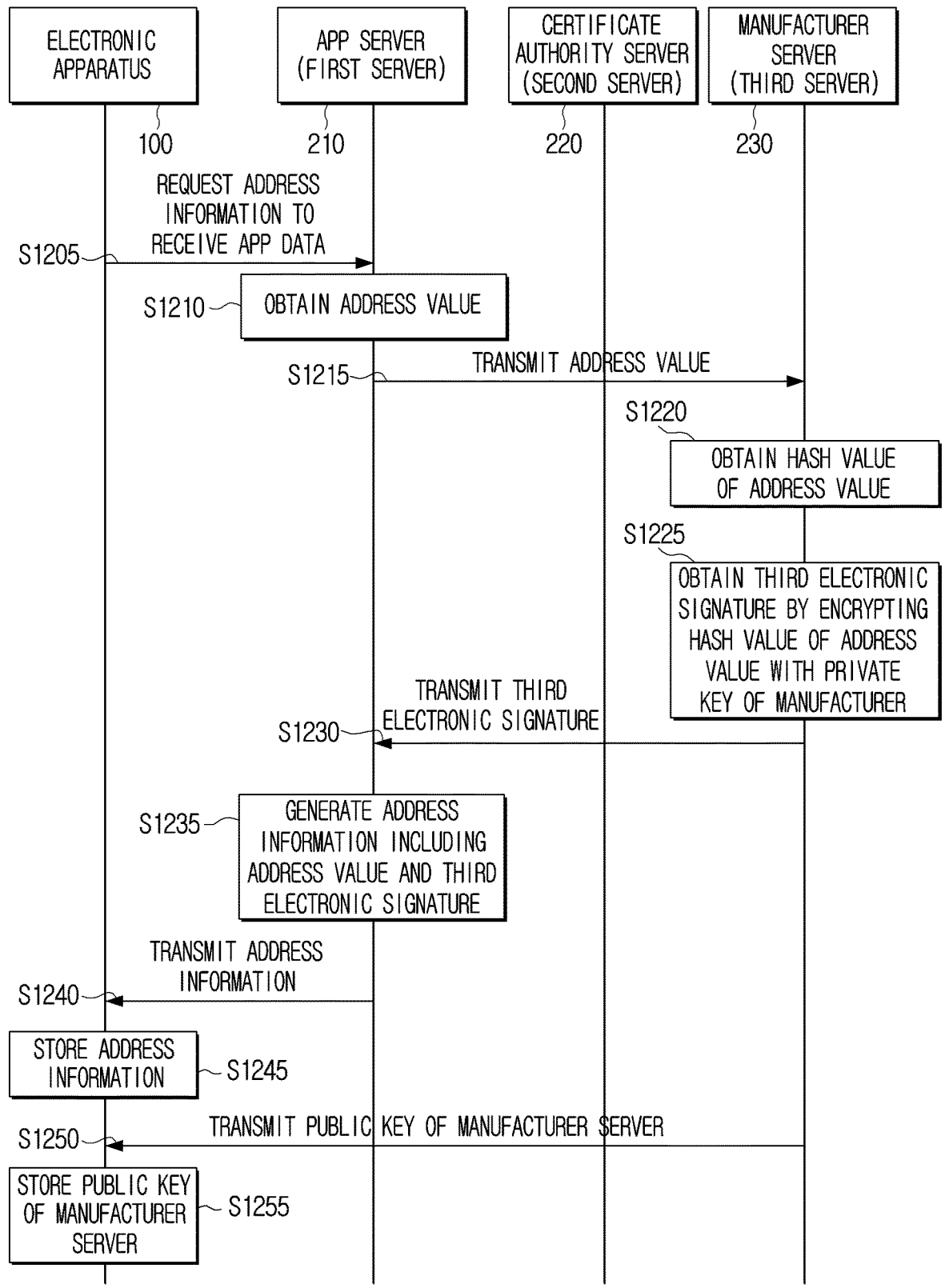
FIG. 12 is a flowchart illustrating an operation of an electronic apparatus obtaining address information according to another embodiment.

FIG. 12 is a flowchart illustrating an operation of an electronic apparatus obtaining address information according to another embodiment.

Referring to FIG. 12, the electronic apparatus 100 may request address information to receive app data to the app server 210 (S1205). Here, operation S1205 may correspond to operation S940.

Further, the app server 210 may be configured to obtain the address value of the server used to transmit the app data (S1210). Further, the app server 210 may be configured to transmit the obtained address value to the manufacturer server 230 (S1215).

Further, the manufacturer server 230 may be configured to convert the address value received from the app server 210 to the hash value of the address value by using the hash function. The manufacturer server 230 may be configured to obtain the hash value of the address value (S1220). Further, the manufacturer server 230 may be configured to obtain the third electronic signature by encrypting the hash value of the address value with the private key of the manufacturer server 230 (S1225). Further, the manufacturer server 230 may be configured to transmit the third electronic signature to the app server 210 (S1230).

Further, the app server 210 may be configured to generate address information including the address value and the third electronic signature (S1235). Further, the app server 210 may be configured to transmit the generated address information to the electronic apparatus 100 (S1240). Further, the electronic apparatus 100 may store the received address information (S1245).

Here, the manufacturer server 230 may be configured to transmit the public key of the manufacturer server 230 to the electronic apparatus 100 (S1250). Further, the electronic apparatus 100 may store the received public key of the manufacturer server 230 (S1255).

Unlike the embodiment of FIG. 10, in the embodiment of FIG. 12, the third electronic signature may be generated from the manufacturer server 230. The manufacturer server 230 may be configured to provide the third electronic signature on the address value only when the reliability verification on the address value is completed after analyzing with respect to the address value transmitted from the app server 210.

According to another embodiment, based on the subject generating the third electronic signature (encryption of the hash value of the address value) being the third server (manufacturer server 230), the electronic apparatus 100 may perform decryption of the hash value of the address value which is encrypted by using the public key of the third server (manufacturer server 230) which is a separate server that was not used in the certification verification. Because the certification verification uses the second server (certificate authority server 220) and the verification on the address value uses the third server (manufacturer server 230), an operation for reliability verification may be doubly carried out.

Figure 13:
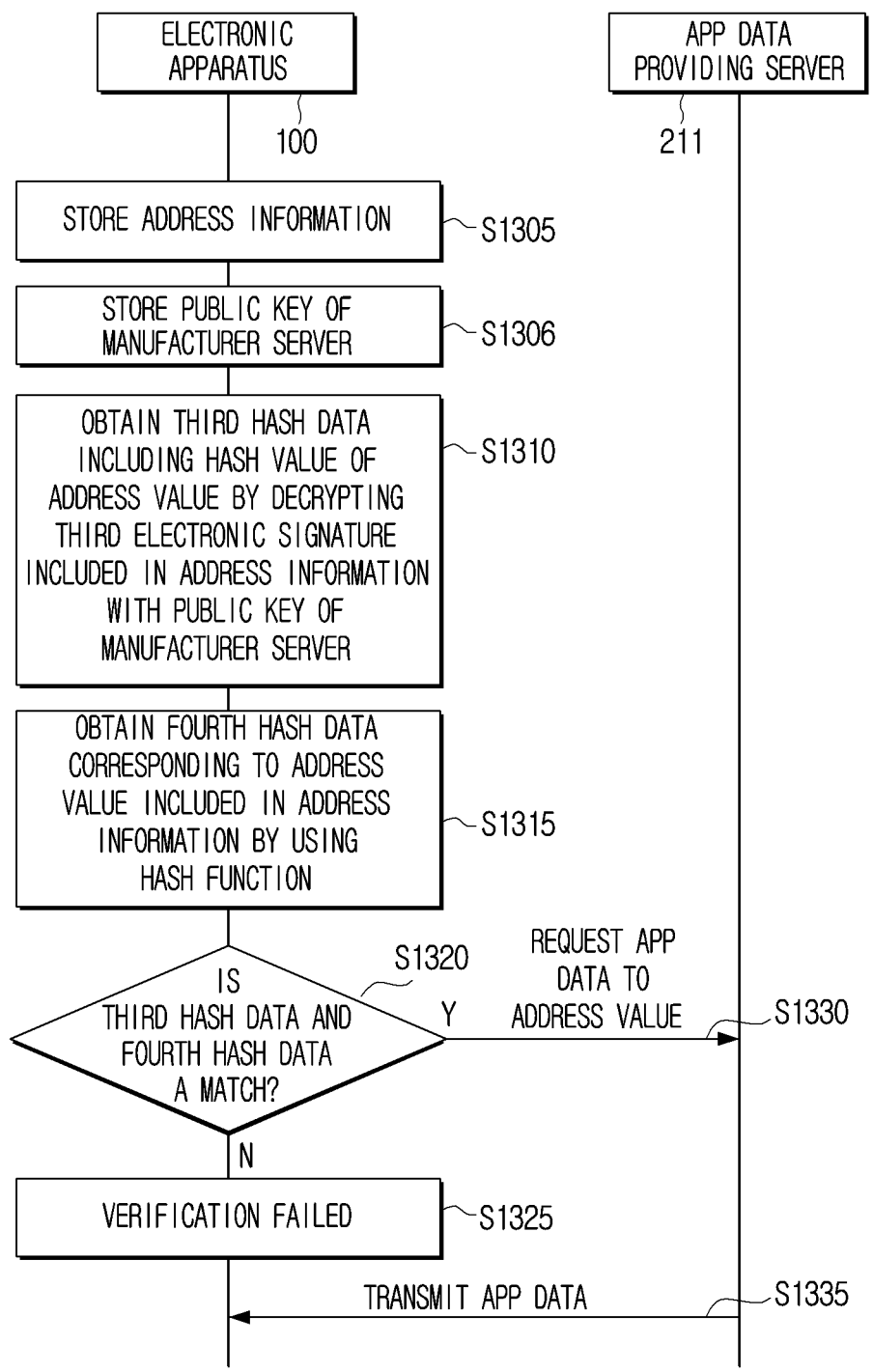
FIG. 13 is a flowchart illustrating an operation of the electronic apparatus of FIG. 12 performing an address verification for server verification.

FIG. 13 is a flowchart illustrating an operation of the electronic apparatus of FIG. 12 performing an address verification for server verification.

Referring to FIG. 13, the electronic apparatus 100 may store the address information (S1305). Further, the electronic apparatus 100 may store the public key of the manufacturer server 230 (S1306). Here, operations S1305 and S1306 may correspond with operations S1245 and S1255.

Further, the electronic apparatus 100 may obtain the third hash data including the hash value of the address value by decrypting the third electronic signature included in the address information using the public key of the manufacturer server 230 (S1310). Specifically, the electronic apparatus 100 may decrypt the third electronic signature based on the public key of the certificate authority server 220, and obtain the third hash data of which the third electronic signature is decrypted.

Further, the electronic apparatus 100 may obtain the fourth hash data corresponding to the address value included in the address information by using the hash function (S1320). Specifically, in the address information, the address value which is not encrypted may be included in addition to the third electronic signature, and the electronic apparatus 100 may obtain the fourth hash data by converting the address value which is not encrypted by using the hash function.

Further, the electronic apparatus 100 may identify whether the third hash data and the fourth hash data are a match (S1320). The electronic apparatus 100 may perform the reliability verification of the address value based on the third hash data and the fourth hash data. Based on the third hash data and the fourth hash data not being a match, electronic apparatus 100 may identity the reliability verification of the address value as having failed (S1325). Based on the third hash data and the fourth hash data being a match, the electronic apparatus 100 may identify the reliability verification of the address value as having succeeded, and generate a control instruction requesting app data to the address value. Further, the electronic apparatus 100 may transmit the generated control instruction (app data request) to the app data providing server 211 corresponding to the address value (S1330). Further, app data providing server 211 may transmit the app data to electronic apparatus 100 (S1335).

Figure 14:
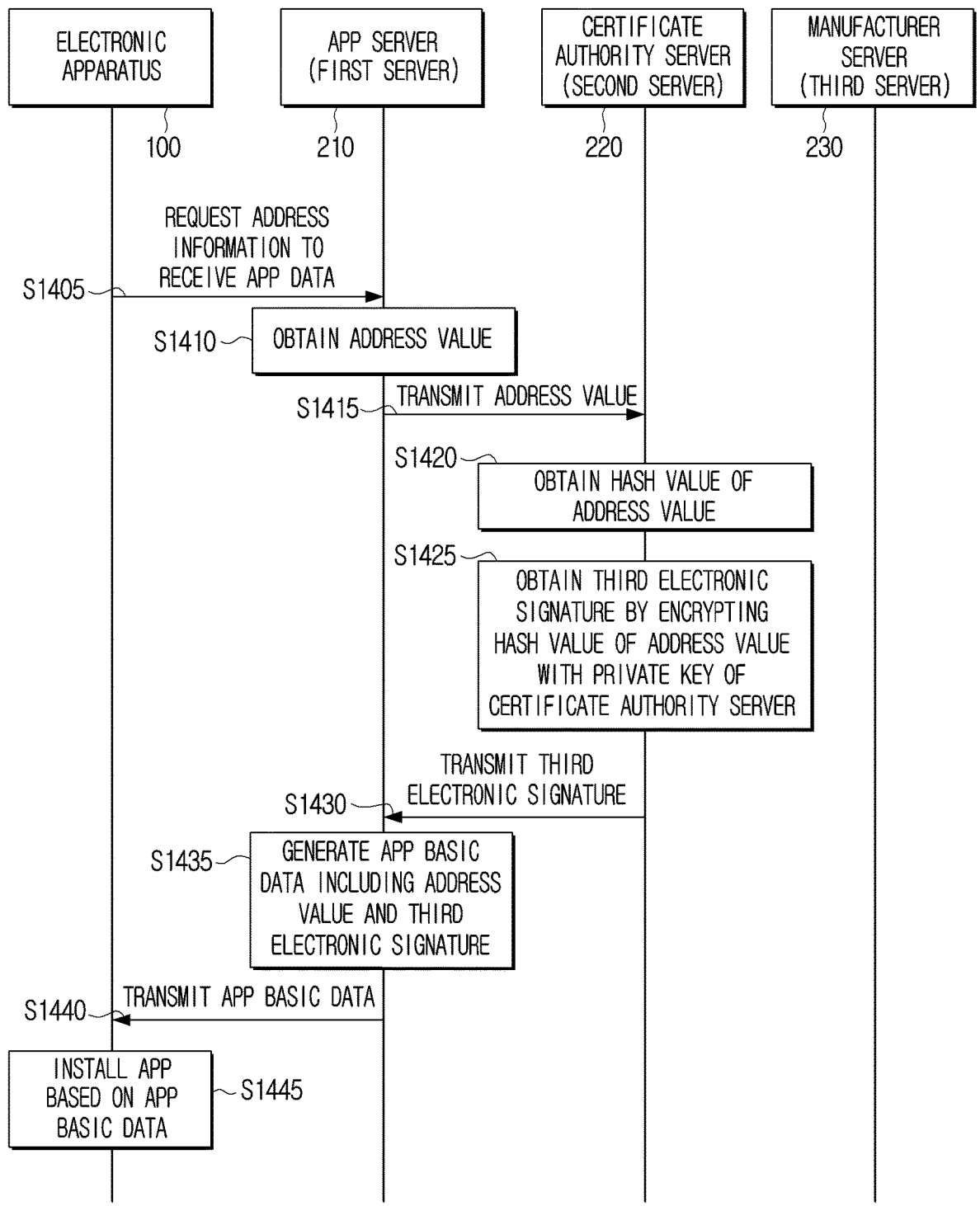
FIG. 14 is a flowchart illustrating an operation of an electronic apparatus installing an app according to another embodiment.

FIG. 14 is a flowchart illustrating an operation of an electronic apparatus installing an app according to another embodiment.

Referring to FIG. 14, operations S1405, S1410, S1415, S1420, S1425, and S1430 may correspond to operations S1005, S1010, S1015, S1020, S1025, and S1030. Accordingly, redundant descriptions will be omitted.

Further, the app server 210 may be configured to generate app basic data including the address value and the third electronic signature (S1435). Here, the app basic data may mean an app at the time of distribution. The distributed app may be an app which is in a state in which an update is not completed and needs an additional update. In addition, the distributed app may mean an app which does not need an update at a current point-in-time but may need an update thereafter.

The app server 210 may include the address value and the third electronic signature in an app. Accordingly, the app basic data may include data associated with the address value, the third electronic signature, and the app. The app server 210 may be configured to transmit the app basic data to the electronic apparatus 100 (S1440). Further, the electronic apparatus 100 may install the app in the electronic apparatus 100 based on the app basic data received from the app server 210 (S1445).

Figure 15:
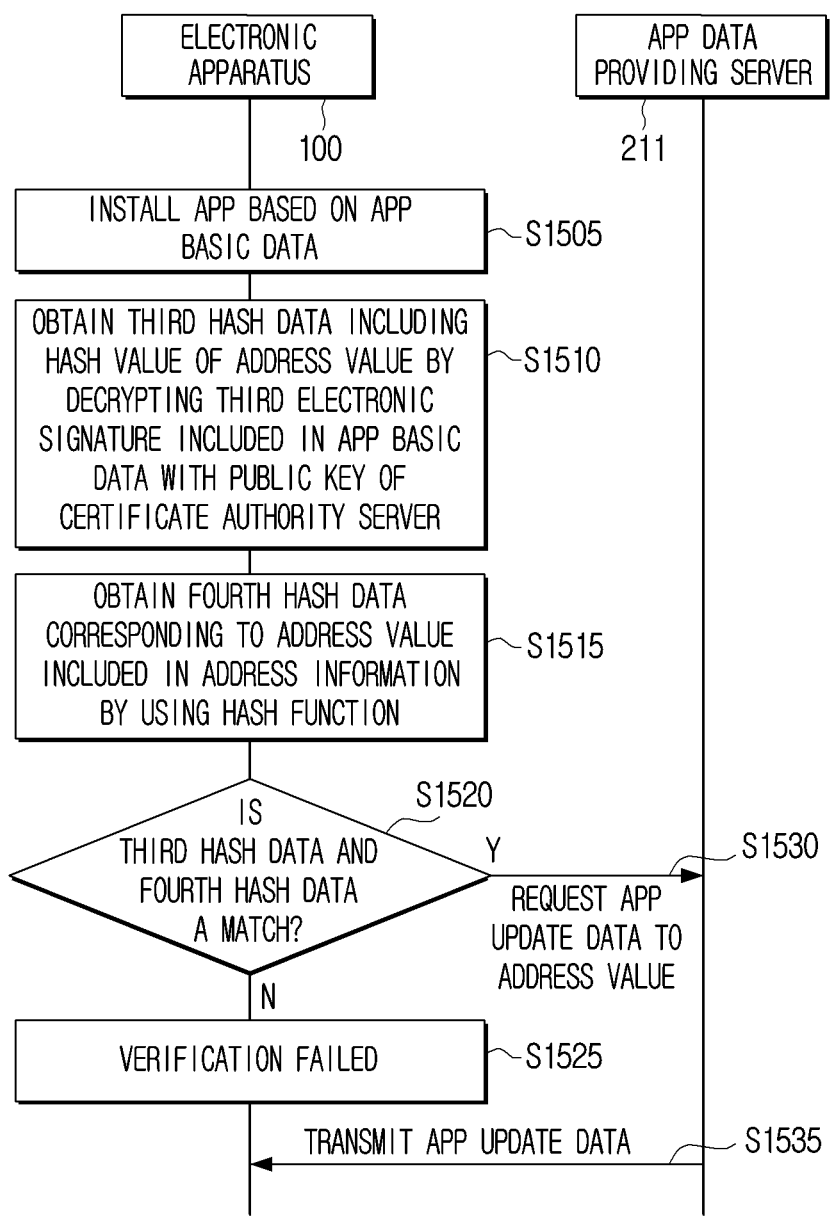
FIG. 15 is a flowchart illustrating an operation of the electronic apparatus of FIG. 14 updating an app.

FIG. 15 is a flowchart illustrating an operation of the electronic apparatus of FIG. 14 updating an app.

Referring to FIG. 15, the electronic apparatus 100 may install the app based on the app basic data (S1505). Here, operation S1505 may correspond with operation S1445.

Further, the electronic apparatus 100 may obtain the third hash data including the hash value of the address value by decrypting the third electronic signature included in the app basic data using the public key of the certificate authority server 220 included in the root certificate (S1510). Specifically, the electronic apparatus 100 may decrypt the third electronic signature based on the public key of the certificate authority server 220, and obtain the third hash data of which the third electronic signature is decrypted.

Further, the electronic apparatus 100 may obtain the fourth hash data corresponding to the address value included in the address information by using the hash function (S1515). Specifically, in the address information, the address value which is not encrypted may be included in addition to the third electronic signature, and the electronic apparatus 100 may obtain the fourth hash data by converting the address value which is not encrypted by using the hash function.

Further, the electronic apparatus 100 may identify whether the third hash data and the fourth hash data are a match (S1520). The electronic apparatus 100 may perform the reliability verification of the address value based on the third hash data and the fourth hash data. Based on the third hash data and the fourth hash data not being a match, the electronic apparatus 100 may identity the reliability verification of the address value as having failed (S1525). Based on the third hash data and the fourth hash data being a match, the electronic apparatus 100 may identify the reliability verification of the address value as having succeeded, and generate a control instruction requesting app update data to the address value. Further, the electronic apparatus 100 may transmit the generated control instruction (app update data request) to the app data providing server 211 corresponding to the address value (S1530). Further, the app data providing server 211 may be configured to transmit the app update data to the electronic apparatus 100 (S1535).

Accordingly, the electronic apparatus 100 may be configured such that the data for installing the app (app basic data) is received through the app server 210, and the data for updating the app (app update data) is received through the app data providing server 211. Here, because an operation for a separate reliability verification is performed with respect to the address value in downloading the data for updating the app from a separate server, reliability on the separate server may be increased.

Figure 16:
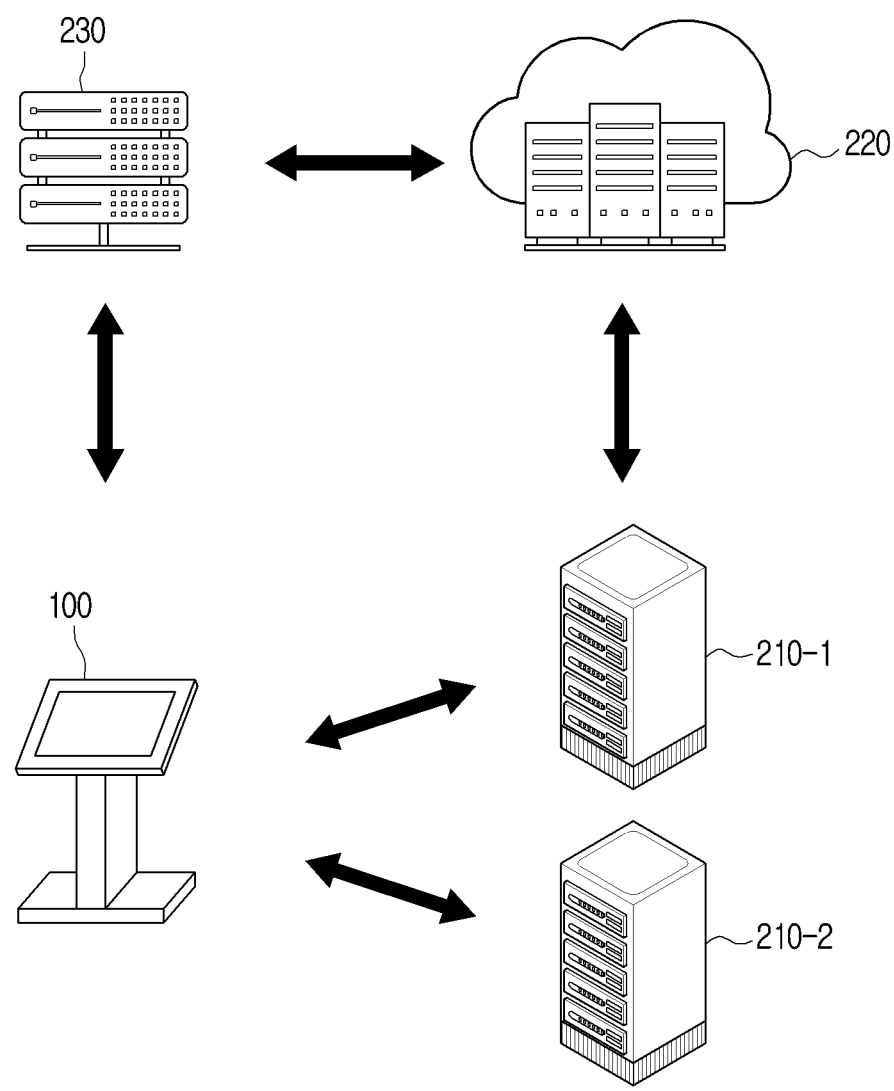
FIG. 16 is a diagram illustrating an operation of an electronic apparatus communicating with a plurality of app servers according to an embodiment.

FIG. 16 is a diagram illustrating an operation of an electronic apparatus communicating with a plurality of app servers according to an embodiment.

Referring to FIG. 16, the electronic apparatus 100 may install a plurality of apps. For example, it may be assumed that a first app and a second app are installed in the electronic apparatus 100. The electronic apparatus 100 may request data on the first app to a first app server 210-1 corresponding to the first app, and request data on the second app to a second app server 210-2 corresponding to the second app. The electronic apparatus 100 may perform the reliability verification on both the first app server 210-1 and the second app server 210-2.

The electronic apparatus 100 may request a certificate to the first app server 210-1 and the second app server 210-2. The first app server 210-1 and the second app server 210-2 may request a certificate to the same certificate authority. For example, the first app server 210-1 and the second app server 210-2 may be configured to request a certificate to the certificate authority server 220. Further, the certificate authority server 220 may be configured to respectively generate a certificate of the certificate authority corresponding to the first app server 210-1 and a certificate of the certificate authority corresponding to the second app server 210-2 by receiving the respective certificate requests.

In addition, the certificate authority server 220 may respectively generate a root certificate corresponding to the first app server 210-1 and a root certificate corresponding to the second app server 210-2, respectively.

The manufacturer server 230 may be configured to receive the root certificate corresponding to the first app server 210-1 and the second app server 210-2, respectively, from the certificate authority server 220 and transmit to the electronic apparatus 100. Further, the electronic apparatus 100 may receive the certificate of the certificate authority corresponding to the respective first app server 210-1 and the second app server 210-2 through the app server 210. Further, the electronic apparatus 100 may perform the reliability verification on the first app server 210-1 and the second app server 210-2 based on the received plurality of certificates of the certificate authority and the received plurality of root certificates.

Figure 17:
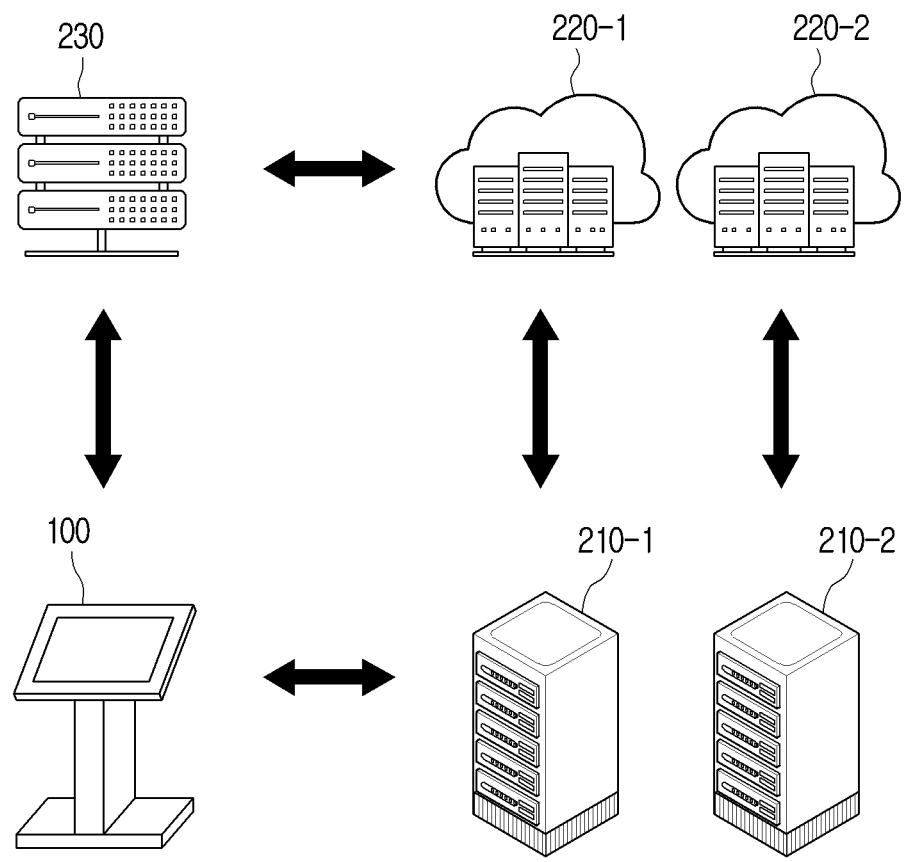
FIG. 17 is a diagram illustrating an operation of an electronic apparatus communicating with a plurality of app servers according to another embodiment.

FIG. 17 is a diagram illustrating an operation of an electronic apparatus communicating with a plurality of app servers according to another embodiment.

Referring to FIG. 17, the electronic apparatus 100 may install the plurality of apps as in the embodiment of FIG. 16. It may be assumed that there is the first app server 210-1 providing the first app and the second app server 210-2 providing the second app.

Here, the first app server 210-1 and the second app server 210-2 may request a certificate to a separate certificate authority. That is, the certificate authority may be different according to the app. Specifically, the first app server 210-1 may request a certificate to a first certificate authority server 220-1, and the second app server 210-2 may request a certificate to a second certificate authority server 220-2.

Here, the first certificate authority server 220-1 may be configured to generate a certificate of the certificate authority corresponding to the first app server 210-1 and a root certificate corresponding to the first app server 210-1. Further, the second certificate authority server 220-2 may be configured to generate a certificate of the certificate authority corresponding to the second app server 210-2 and a root certificate corresponding to the second app server 210-2. Further, the manufacturer server 230 may be configured to receive the root certificates from the respective first certificate authority server 220-1 and the second certificate authority server 220-2 and transmit to the electronic apparatus 100. Further, the electronic apparatus 100 may receive the certificates of the certificate authority from the respective first certificate authority server 220-1 and the second certificate authority server 220-2 and transmit to the electronic apparatus 100. Further, the electronic apparatus 100 may perform the reliability verification on the first app server 210-1 and the second app server 210-2 based on the received plurality of certificates of the certificate authority and the received plurality of root certificates.

Figure 18:
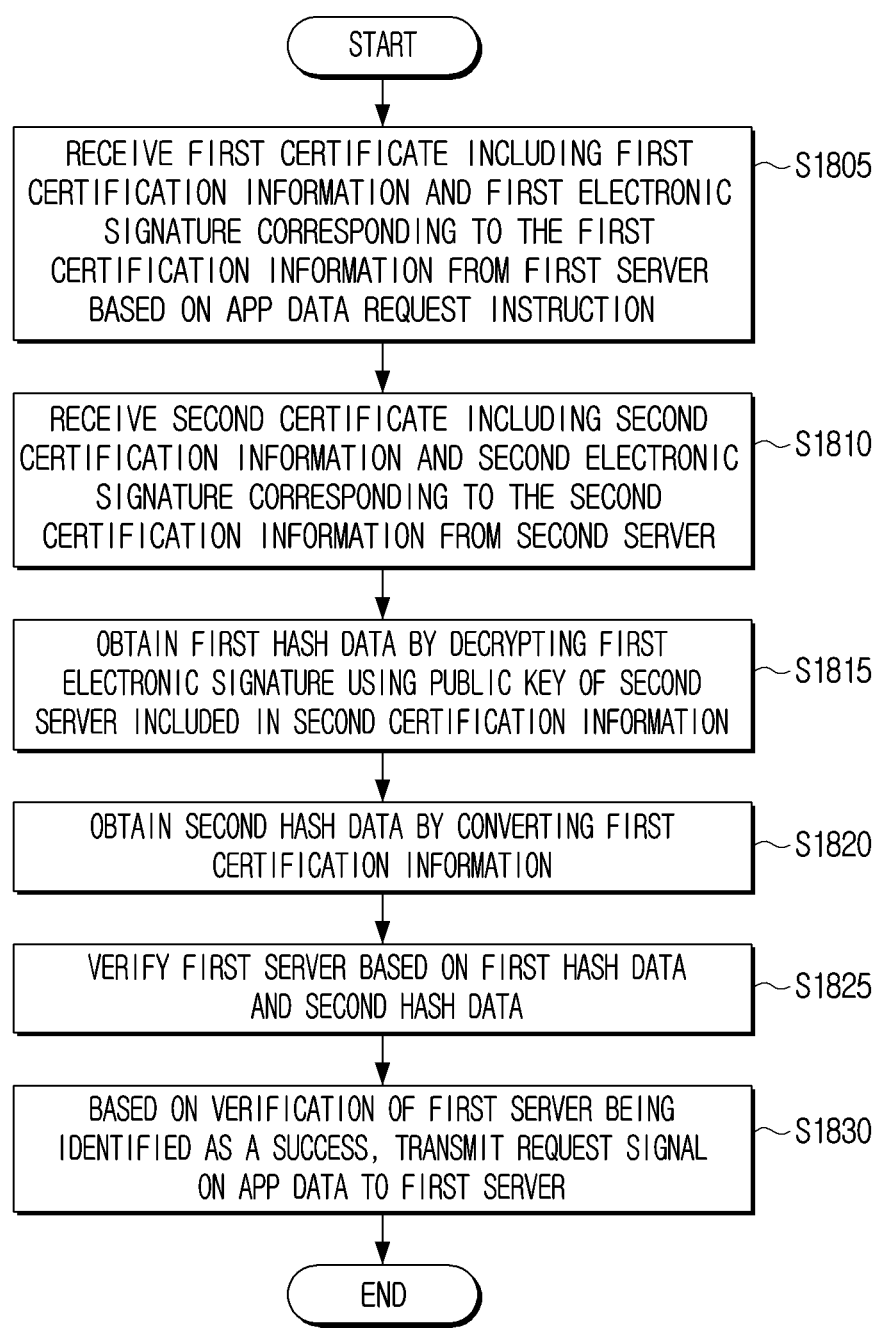
FIG. 18 is a flowchart illustrating a control operation of an electronic apparatus according to an embodiment.

FIG. 18 is a flowchart illustrating a control operation of an electronic apparatus according to an embodiment.

Referring to FIG. 18, a controlling method of the electronic apparatus 100 may include receiving the first certificate including the first certification information and the first electronic signature corresponding to the first certification information from the first server 210 based on an app data request instruction (S1805), receiving the second certificate including the second certification information and the second electronic signature corresponding to the second certification information from the second server 220 (S1810), obtaining the first hash data by decrypting the first electronic signature using the public key of the second server 220 included in the second certification information (S1815), obtaining the second hash data by converting the first certification information (S1820), verifying the first server 210 based on the first hash data and the second hash data (S1825), and transmitting, based on the verification of the first server 210 being identified as a success, the request signal on the app data to the first server 210 (S1830).

The verifying the first server (S1825) may include identifying the verification of the first server 210 as a success based on the first hash data and the second hash data matching, and the transmitting the request signal for the app data to the first server 210 may include transmitting the request signal for the address information to receive the app data to the server 210 based on the verification of the first server 210 being identified as a success.

The controlling method may further include receiving the address information including the address value and the third electronic signature corresponding to the address value from the first server 210, obtaining the third hash data by decrypting the third electronic signature using the public key of the second server 220, obtaining the fourth hash data by converting the address value included in the address information, and requesting, based on the third hash data and the fourth hash data being a match, app data to the address value.

The third electronic signature may include the hash value of the address value encrypted with the private key of the second server 220.

The obtaining the third hash data may include obtaining the third hash data including the hash value of the address value by decrypting the third electronic signature with the public key of the second server 220, and the obtaining the fourth hash data may include obtaining the fourth hash data corresponding to the address value included in the address information by using the hash function.

The first electronic signature may include the hash value of the public key of the first server 210 and the hash value of the first additional information which are encrypted with the private key of the second server 220, the first certification information may include the public key of the first server 210 and the first additional information, and the first additional information may include the application subject of the first certificate and the validity period of the first certificate.

The obtaining the first hash data (S1815) may include obtaining the first hash data including the hash value of the public key of the first server 210 and the hash value of the first additional information by decrypting the first electronic signature included in the first certificate with the public key of the second server 220 included in the received second certificate, and the obtaining the second hash data (S1820) may include obtaining the public key of the first server 210 and the second hash data corresponding to the first additional information included in the first certificate by using the hash function.

The second electronic signature may include the hash value of the public key of the second server 220 and the hash value of the second additional information encrypted with the private key of the second server 220, the second certification information may include the public key of the second server 220 and the second additional information, and the second additional information may include the application subject of the second certificate and the validity period of the second certificate.

The application subject of the first certificate and the application subject of the second certificate may be different.

The controlling method may further include transmitting, to the third server 230, the control signal questioning whether the certificate which is not stored in the pre-stored certificate list can be identified based on the pre-set event.

The controlling method of the electronic apparatus 100 as described in FIG. 18 may be executed on an electronic apparatus having the configuration of FIG. 3 or the configuration of FIG. 4, and on an electronic apparatus having a configuration in addition thereto.

The methods according to the various embodiments of the disclosure described above may be implemented in an application form installable in an electronic apparatus of the related art.

In addition, the methods according to the various embodiments of the disclosure described above may be implemented with only a software upgrade or a hardware upgrade on an electronic apparatus of the related art.

In addition, the various embodiments of the disclosure as described above may be performed through an embedded server provided in the electronic apparatus, or through at least one external server of the electronic apparatus and the display device.

According to an embodiment, the various embodiments described above may be implemented with software including instructions stored in a machine-readable storage media (e.g., computer). The machine may call a stored instruction from the storage medium, and as a device capable of operating according to the called instruction, may include an electronic apparatus according to the embodiments described. Based on the instruction being executed by the processor, the processor may directly or using other elements under the control of the processor perform a function corresponding to the instruction. The instruction may include a code generated by a compiler or executed by an interpreter. The machine-readable storage medium may be provided in the form of a non-transitory storage medium. Herein, 'non-transitory' merely means that the storage medium is tangible and does not include a signal, and the term does not differentiate data being semi-permanently stored or being temporarily stored in the storage medium.

In addition, according to an embodiment, a method according to the various embodiments described above may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product may be at least stored temporarily in a storage medium such as a server of a manufacturer, a server of an application store, or a memory of a relay server, or temporarily generated.

Each of the elements (e.g., a module or a program) according to various embodiments described above may be comprised of a single entity or a plurality of entities, and some sub-elements of the abovementioned sub-elements may be omitted, or different sub-elements may be further included in the various embodiments. Alternatively or additionally, some elements (e.g., modules or programs) may be integrated into one entity to perform the same or similar functions performed by the respective elements prior to integration. Operations performed by a module, a program, or another element, in accordance with various embodiments, may be performed sequentially, in a parallel, repetitively, or in a heuristically manner, or at least some operations may be performed in a different order, omitted or a different operation may be added.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. An electronic apparatus, comprising:
   a memory;
   a communication interface; and
   a processor configured to:
   store, in the memory, a first certificate comprising first certification information and a first electronic signature corresponding to the first certification information received from a first server based on an application data request, and store, in the memory, a second certificate comprising second certification information and a second electronic signature corresponding to the second certification information received from a second server;
   obtain first hash data by decrypting the first electronic signature using a public key of the second server comprised in the second certification information;
   obtain second hash data by converting the first certification information;
   verify the first server based on the first hash data and the second hash data being a match;
   control, based on the first server being verified, the communication interface to transmit a request signal for address information to receive the application data to the first server,
   receive the address information which comprises an address value and a third electronic signature corresponding to the address value from the first server,
   obtain third hash data by decrypting the third electronic signature using the public key of the second server,
   obtain fourth hash data by converting the address value comprised in the address information, and
   request, based on the third hash data and the fourth hash data being a match, the application data to the address value.

2. The electronic apparatus of claim 1, wherein the third electronic signature comprises a hash value of the address value encrypted with a private key of the second server.

3. The electronic apparatus of claim 2, wherein the processor is configured to obtain third hash data comprising a hash value of the address value by decrypting the third electronic signature with the public key of the second server, and
   obtain fourth hash data corresponding to the address value comprised in the address information by using a hash function.

4. The electronic apparatus of claim 1, wherein the first electronic signature comprises a hash value of a public key of the first server and a hash value of first additional information which are encrypted with a private key of the second server,
   wherein the first certification information comprises the public key of the first server and the first additional information, and
   wherein the first additional information comprises an application subject of the first certificate and a validity period of the first certificate.

5. The electronic apparatus of claim 4, wherein the processor is configured to:
   obtain the first hash data comprising the hash value of the public key of the first server and the hash value of the first additional information by decrypting the first electronic signature comprised in the first certificate with the public key of the second server comprised in the received second certificate, and
   obtain the public key of the first server and the second hash data corresponding to the first additional information comprised in the first certificate by using a hash function.

6. The electronic apparatus of claim 1, wherein the second electronic signature comprises a hash value of the public key of the second server and a hash value of second additional information which are encrypted with a private key of the second server, wherein second certification information comprises the public key of the second server and the second additional information, and wherein the second additional information comprises an application subject of the second certificate and a validity period of the second certificate.

7. The electronic apparatus of claim 6, wherein,
an application subject of the first certificate and the application subject of the second certificate are different.

8. A method of controlling an electronic apparatus, the method comprising:
receiving a first certificate comprising first certification information and a first electronic signature corresponding to the first certification information from a first server based on an application data request instruction;
receiving a second certificate comprising second certification information and a second electronic signature corresponding to the second certification information from a second server;
obtaining first hash data by decrypting the first electronic signature using a public key of the second server comprised in the second certification information;
obtaining second hash data by converting the first certification information;
verifying the first server based on the first hash data and the second hash data being match;
transmitting, based on the first server being verified, a request signal for address information to receive the application data to the first server;
receiving the address information which comprises an address value and a third electronic signature corresponding to the address value from the first server;
obtaining third hash data by decrypting the third electronic signature using the public key of the second server;
obtaining fourth hash data by converting the address value comprised in the address information; and
requesting, based on the third hash data and the fourth hash data being a match, the application data to the address value.

9. The method of claim 8, wherein the third electronic signature comprises a hash value of the address value encrypted with a private key of the second server.

10. The method of claim 9, wherein the obtaining of the third hash data comprises obtaining the third hash data comprising the hash value of the address value by decrypting the third electronic signature with the public key of the second server, and wherein the obtaining of the fourth hash data comprises obtaining the fourth hash data corresponding to the address value comprised in the address information by using a hash function.

11. The method of claim 8, wherein the first electronic signature comprises the hash value of the public key of the first server and the hash value of first additional information which are encrypted with a private key of the second server, wherein the first certification information may include the public key of the first server and the first additional information, and wherein the first additional information may include an application subject of the first certificate and a validity period of the first certificate.

12. The method of claim 11, wherein the obtaining of the first hash data may include obtaining the first hash data including a hash value of the public key of the first server and a hash value of the first additional information by decrypting the first electronic signature included in the first certificate with the public key of the second server included in the received second certificate, and wherein the obtaining the second hash data may include obtaining the public key of the first server and the second hash data corresponding to the first additional information included in the first certificate by using a hash function.

13. The method of claim 8, wherein the second electronic signature may include a hash value of the public key of the second server and a hash value of second additional information which are encrypted with a private key of the second server, wherein the second certification information may include the public key of the second server and the second additional information, and wherein the second additional information may include an application subject of the second certificate and a validity period of the second certificate.

14. The method of claim 13, wherein an application subject of the first certificate and an application subject of the second certificate may be different.

* * * * *